United States Patent
Yerramalli et al.

(10) Patent No.: US 11,115,170 B2
(45) Date of Patent: *Sep. 7, 2021

(54) TECHNIQUES FOR ADJUSTING CLEAR CHANNEL ASSESSMENT (CCA) WINDOW FOR TRANSMISSIONS IN A SHARED RADIO FREQUENCY SPECTRUM BAND

(71) Applicant: QUALCOMM incorporated, San Diego, CA (US)

(72) Inventors: Srinivas Yerramalli, San Diego, CA (US); Tao Luo, San Diego, CA (US); Aleksandar Damnjanovic, Del Mar, CA (US); Peter Gaal, San Diego, CA (US); Ravi Teja Sukhavasi, La Jolla, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/266,878

(22) Filed: Feb. 4, 2019

(65) Prior Publication Data

US 2019/0190679 A1 Jun. 20, 2019

Related U.S. Application Data

(63) Continuation of application No. 15/150,790, filed on May 10, 2016, now Pat. No. 10,292,158.
(Continued)

(51) Int. Cl.
*H04L 5/00* (2006.01)
*H04W 72/04* (2009.01)
(Continued)

(52) U.S. Cl.
CPC .......... *H04L 5/0055* (2013.01); *H04L 1/1657* (2013.01); *H04L 1/187* (2013.01);
(Continued)

(58) Field of Classification Search
CPC ... H04L 1/0001; H04L 1/1657; H04L 1/1812; H04L 1/1822; H04L 1/187; H04L 5/0055;
(Continued)

(56) References Cited

U.S. PATENT DOCUMENTS

| 9,301,319 B2 | 3/2016 | Barriac et al. |
| 2006/0193274 A1 | 8/2006 | Yamagata |

(Continued)

FOREIGN PATENT DOCUMENTS

| WO | WO 2013006988 A1 | 1/2013 |
| WO | WO-2014110513 A1 | 7/2014 |

OTHER PUBLICATIONS

Ericsson: "Coexistence Evaluation Results for DL+UL LAA with Cat 4 UL LBT", 3GPP TSG Ran WG1 Meeting #81, 3GPP Draft; R1-153129, 3rd Generation Partnership Project (3GPP), Mobile Competence Centre; 650, Route Des Lucioles; F-06921 Sophia-Antipolis Cedex; France, vol. Ran WG1, No. Fukuoka, Japan; May 25, 2015-May 29, 2015, May 16, 2015 (May 16, 2015), 7 Pages, XP050973085, Retrieved from the Internet: URL: http://www.3gpp.org/ftp/tsg_ran/WG1_RL1/TSGR1_81/Docs/ [retrieved on May 16, 2015].
(Continued)

*Primary Examiner* — Kan Yuen
(74) *Attorney, Agent, or Firm* — Dalei Dong

(57) ABSTRACT

Techniques and devices are described for wireless communication. A base station may determine a parameter associated with a transmission such as hybrid automatic repeat request (HARQ) feedback, a signal-to-noise ratio, or a determination regarding whether the transmission was suc-
(Continued)

cessfully decoded. The base station may then determine a contention window adjustment value based on the parameter. The base station may then apply weighting factor (e.g., based on the time of the transmission, a number of devices being served, aspects of the transmission parameter, etc.) to the contention window adjustment value may adjust a contention window size for a second transmission based on the weighted contention window adjustment value (and, in some cases, other weighted adjustments based on other transmissions). The base station may then perform a clear channel assessment (CCA) based on the contention window size.

36 Claims, 21 Drawing Sheets

Related U.S. Application Data

(60) Provisional application No. 62/165,928, filed on May 23, 2015, provisional application No. 62/236,827, filed on Oct. 2, 2015.

(51) Int. Cl.
| | | |
|---|---|---|
| *H04L 1/18* | (2006.01) | |
| *H04W 4/06* | (2009.01) | |
| *H04W 74/08* | (2009.01) | |
| *H04W 76/28* | (2018.01) | |
| *H04L 1/16* | (2006.01) | |

(52) U.S. Cl.
CPC .......... *H04L 1/1812* (2013.01); *H04L 1/1822* (2013.01); *H04W 4/06* (2013.01); *H04W 72/042* (2013.01); *H04W 72/0413* (2013.01); *H04W 72/0453* (2013.01); *H04W 74/08* (2013.01); *H04W 74/0808* (2013.01); *H04W 76/28* (2018.02); *H04W 72/0406* (2013.01)

(58) Field of Classification Search
CPC .... H04L 47/27; H04W 4/06; H04W 72/0406; H04W 72/0413; H04W 72/042; H04W 72/0453; H04W 74/0808; H04W 76/28
See application file for complete search history.

(56) References Cited

U.S. PATENT DOCUMENTS

| | | | |
|---|---|---|---|
| 2008/0212477 A1* | 9/2008 | Yun .................. | H04L 12/66 370/235 |
| 2010/0265906 A1 | 10/2010 | Bucknell et al. | |
| 2011/0182171 A1 | 7/2011 | McNew et al. | |
| 2011/0243066 A1* | 10/2011 | Nayeb Nazar .......... | H04L 1/007 370/328 |
| 2013/0042157 A1 | 2/2013 | Mohammadi et al. | |
| 2013/0044797 A1 | 2/2013 | Nammi | |
| 2014/0112289 A1 | 4/2014 | Kim et al. | |
| 2014/0303806 A1* | 10/2014 | Bai .................... | G01C 21/3697 701/1 |
| 2015/0117271 A1 | 4/2015 | Liang et al. | |
| 2016/0119762 A1 | 4/2016 | Zhu et al. | |
| 2016/0309511 A1* | 10/2016 | Li ..................... | H04W 74/0808 |
| 2016/0345326 A1 | 11/2016 | Yerramalli et al. | |
| 2017/0055296 A1* | 2/2017 | Cheng ............... | H04W 74/0808 |
| 2017/0142746 A1* | 5/2017 | Koorapaty ........... | H04W 16/14 |
| 2017/0280331 A1* | 9/2017 | Gou .................... | H04L 5/0007 |
| 2018/0175975 A1* | 6/2018 | Um .................... | H04L 1/1816 |
| 2019/0190679 A1* | 6/2019 | Yerramalli ......... | H04W 72/0453 |
| 2020/0374933 A1* | 11/2020 | Lou ..................... | H04L 1/1887 |

OTHER PUBLICATIONS

Ericsson: "Findings Based on Coexistence Evaluation Results for LAA with DL and UL Transmissions", 3GPP TSG Ran WG1 Meeting #81, 3GPP Draft; R1-153131, 3rd Generation Partnership Project (3GPP), Mobile Competence Centre; 650, Route Des Lucioles; F-06921 Sophia-Antipolis Cedex; France, vol. Ran WG1, No. Fukuoka, Japan; May 25, 2015-May 29, 2015, May 22, 2015 (May 22, 2015), 4 Pages, XP050977650, Retrieved from the Internet: URL: http://www.3gpp.org/ftp/tsg_ran/WG1_RL1/TSGR1_81/Docs/ [retrieved on May 22, 2015].
ZTE: "Overview on LAA UL", 3GPP TSG Ran WG1 Meeting #81, 3GPP Draft; R1-152970 Overview on LAA UL, 3rd Generation Partnership Project (3GPP), Mobile Competence Centre; 650, Route Des Lucioles; F-06921 Sophia-Antipolis Cedex; France, vol. Ran WG1, No. Fukuoka, Japan; May 25, 2015-May 29, 2015, May 16, 2015 (May 16, 2015), 6 Pages, XP050972653, Retrieved from the Internet: URL: http://www.3gpp.org/ftp/tsg_ran/WG1_RL1/TSGR1_81/Docs/ [retrieved on May 16, 2015].
Fujitsu: "Further Analysis on Control Signal and Scheduling Assignment for D2d Communication", 3GPP Draft; R1-141229 D2D Ctrl Signal, 3rd Generation Partnership Project (3GPP), Mobile Competence Centre, 650, Route Des Lucioles ; F-06921 Sophia-Antipolis Cedex, France, vol. Ran WG1, No. Shenzhen, China; Mar. 31, 2014-Apr. 4, 2014, Mar. 30, 2014 (Mar. 30, 2014), XP050786904, pp. 1-7, Retrieved from the Internet: URL: http://www.3gpp.org/ftp/Meetings_3GPP_SYNC/RAN1/Docs/ [retrieved on Mar. 30, 2014].
Intel Corporation: "Distributed Resource Allocation for D2D Communication", 3GPP Draft; R1-142016 Intel—D2DRA—Model, 3rd Generation Partnership Project (3GPP), Mobile Competence Centre, 650, Route Des Lucioles ; F-06921 Sophia-Antipolis Cedex, France, vol. Ran WG1, No. Seoul, Korea; May 19, 2014-May 23, 2014, May 18, 2014 (May 18, 2014), XP050789136, pp. 1-8, Retrieved from the Internet: URL: http://www.3gpp.org/ftp/Meetings_3GPP_SYNC/RAN1/Docs/ [retrieved on May 18, 2014].
Intel Corporation: "eNB Controlled Resource Allocation for D2D Communication", 3GPP Draft, R1-142017 Intel—D2DRA—Model, 3rd Generation Partnership Project (3GPP), Mobile Competence Centre, 650, Route Des Lucioles, F-06921 Sophia-Anti Polis Cedex, France, vol. Ran WG1, no. Seoul, Korea; May 19, 2014-May 23, 2014 (May 18, 2014), XP050789137, pp. 1-6, Retrieved from the Internet: http://www.3gpp.org/ftp/Meetings_3GPP_SYNC/RAN1/Docs/ [retrieved on 2014-05-18] Chapters 3.3 and 3.4, p. 4-p. 5 Chapter 3.2.
Interdigital: "On Control Signaling and Scheduling Assignments for D2D", 3GPP Draft; R1142350, 3rd Generation Partnership Project (3GPP), Mobile Competence Centre, 650, Route Des Lucioles ; F-06921 Sophia-Antipolis Cedex, France, vol. Ran WG1, No. Seoul, Korea; May 19, 2014-May 23, 2014, May 18, 2014 (May 18, 2014), XP050787944, 4 Pages, Retrieved from the Internet: URL: http://www.3gpp.org/ftp/Meetings_3GPP_SYNC/RAN1/Docs/ [retrieved on May 18, 2014].
ETRI: "Discussion on HARQ Operation for LAA", [Online] Feb. 8, 2015 (Feb. 8, 2015), 3GPP Draft, R1-150633-Discussion on HARQ Operation for LAA, 3rd Generation Partnership Project (3GPP), Mobile Competence Centre, 650, Route Des Lucioles, F-06921 Sophia-Antipolis Cedex, France, XP050933836, pp. 1-12, Retrieved from the Internet: URL:http://www.3gpp.org/ftp/Meetings3GPPSYNC/RAN1/Docs/ [retrieved on Feb. 8, 2015].
Fujitsu: "Evaluation Results for DL+UL LAA and Wi-Fi", 3GPP Draft, R1-152654 Evaluation Results for DL+UL LAA and WiFi Final, 3rd Generation Partnership Project (3GPP), Mobile Competence Centre, 650, Route Des Lucioles, F-06921 Sophia-Antipolis Cedex, vol. Ran WG1, No. Fukuoka, Japan, May 25, 2015-May 29, 2015 May 15, 2015 (May 15, 2015), pp. 5, XP050972284, Retrieved from the Internet: URL:http://www.3gpp.org/ftp/tsg_ran/WG1_RL1/TSGR1_81/Docs/ [retrieved on May 15, 2015].
International Search Report and Written Opinion—PCT/US2016/031918—ISA/EPO dated Jul. 28, 2016.
LG Electronics: "DL LBT Operation with Variable Contention Window Size", 3GPP Draft, R1-152732 Cat 4 Design_Final, 3rd Generation Partnership Project—(3GPP), Mobile Competence Centre, 650, Route Des Lucioles, F-06921 Sophia-Antipolis Cedex, France, vol. Ran WG1. no. Fukuoka. Japan, May 25, 2015-May 29, 2015 May 16, 2015 (May 16, 2015), XP050972717, pp. 1-6,

(56) References Cited

OTHER PUBLICATIONS

Retrieved from the Internet: URL:http://www.3gpp.org/ftp/tsg_ran/WG1_RL1/TSGR1_81/Docs/ [retrieved on May 16, 2015].

Lucent A., et al., "LBT and Frame Structure Design for DL-Only LAA", 3GPP Draft, R1-153385-LBT-DL—Final, 3rd Generation Partnership Project (3GPP), Mobile Competence Centre, 650, Route Des Lucioles, F-06921 Sophia-Anti Polis Cedex, France, vol. Ran WG1. No. Fukuoka. Japan, May 25, 2015-May 29, 2015 May 19, 2015 (May 19, 2015), pp. 1-6, XP050976635, Retrieved from the Internet: URL:http://www.3gpp.org/ftp/tsg_ran/WG1_RL1/TSGRI_81/Docs/ [retrieved on May 19, 2015].

Taiwan Search Report—TW105114590—TIPO—dated Nov. 29, 2019.

Alcatel-Lucent, et al., "Control Signaling for LAA", 3GPP TSG-RAN WG1#81 R1-152995, May 16, 2015, pp. 1-5,URL:http://www.3gpp.org/ftp/tsg_ran/WG1_RL1/TSGR1_81/Docs/R1-152995.zip.

LG Electronics: "Candidate Solutions for LAA Operation", 3GPP TSG Ran WG1 Meeting #78bis, 3GPP Draft; R1-144042, LAA Candidate Solutions Final, 3rd Generation Partnership Project (3GPP), Mobile Competence Centre, 650, Route Des Lucioles, F-06921, Sophia-Antipolis Cedex, France, vol. Ran WG1, No. Ljubljana, Slovenia; Oct. 6, 2014-Oct. 10, 2014 (Oct. 10, 2014), Sep. 27, 2014, 6 Pages, XP050869704, URL: https://www.3gpp.org/ftp/tsg_ran/WG1_RL1/TSGR1_78b/Docs/R1-144042.zip.

\* cited by examiner

TECHNIQUES FOR ADJUSTING CLEAR CHANNEL ASSESSMENT (CCA) WINDOW FOR TRANSMISSIONS IN A SHARED RADIO FREQUENCY SPECTRUM BAND

CROSS REFERENCES

The present Application for Patent is a Continuation of U.S. patent application Ser. No. 15/150,790 by Yerramalli et al., entitled "Techniques For Adjusting Clear Channel Assessment (CCA) Window For Transmissions in a Shared Radio Frequency Spectrum Band" filed May 10, 2016, which claims priority to U.S. Provisional Patent Application No. 62/165,928 by Yerramalli et al., entitled "Techniques for Adjusting Clear Channel Assessment (CCA) Window for Transmissions in a Shared Radio Frequency Spectrum Band," filed May 23, 2015, and Application No. 62/236,827 by Yerramalli et al., entitled "Techniques for Adjusting Clear Channel Assessment (CCA) Window for Transmissions in a Shared Radio Frequency Spectrum Band," filed Oct. 2, 2015, each of which is assigned to the assignee hereof, and each of which is hereby incorporated by reference in its entirety.

BACKGROUND

Field of the Disclosure

The present disclosure, for example, relates to wireless communications systems, and more specifically to techniques for adjusting clear channel assessment (CCA) window for transmissions in a shared radio frequency spectrum band.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple access communications system may include a number of base stations, each simultaneously supporting communication for multiple communication devices, which may be otherwise known as user equipment (UE).

In some cases, a wireless system may operate in shared or unlicensed radio frequency spectrum band. A UE or base station operating in the shared or unlicensed radio frequency spectrum band may perform a clear channel assessment (CCA) to verify that the channel is clear prior to transmitting.

SUMMARY

The present disclosure, for example, relates to one or more techniques for adjusting clear channel assessment (CCA) window for transmissions in a shared radio frequency spectrum band. More specifically, the techniques relate to identifying (e.g., a base station) a parameter associated with a first transmission, such as hybrid automatic repeat request (HARM) feedback, a signal-to-noise ratio, or a determination regarding whether the transmission was successfully decoded. The base station may then determine a contention window adjustment value based on the parameter. The base station may then apply a weighting factor (e.g., based on the time of the transmission, a number of devices being served, aspects of the transmission parameter, etc.) to the contention window adjustment value. A contention window size for a second transmission may then be adjusted based on the weighted contention window adjustment value (and, in some cases, other weighted adjustments based on other transmissions). The base station may then either perform a clear channel assessment (CCA) based on the contention window size, or may signal the contention window size to a user equipment (UE) that may perform the CCA (e.g., for an uplink transmission).

A method of wireless communication is described. The method may include determining a first parameter associated with a first transmission, determining a first contention window adjustment value based at least in part on the first parameter, applying a first weighting factor to the first contention window adjustment value and adjusting a contention window size for a second transmission based at least in part on the weighted first contention window adjustment value.

An apparatus for wireless communication is described. The apparatus may include means for determining a first parameter associated with a first transmission, means for determining a first contention window adjustment value based at least in part on the first parameter, means for applying a first weighting factor to the first contention window adjustment value and means for adjusting a contention window size for a second transmission based at least in part on the weighted first contention window adjustment value.

A further apparatus is described. The apparatus may include a processor, memory in electronic communication with the processor, and instructions stored in the memory. The instructions may be operable to cause the processor to determine a first parameter associated with a first transmission, determine a first contention window adjustment value based at least in part on the first parameter, apply a first weighting factor to the first contention window adjustment value and adjust a contention window size for a second transmission based at least in part on the weighted first contention window adjustment value.

A non-transitory computer readable medium for wireless communication is described. The non-transitory computer-readable medium may include instructions to cause a processor to determine a first parameter associated with a first transmission, determine a first contention window adjustment value based on the first parameter, apply a first weighting factor to the first contention window adjustment value and adjust a contention window size for a second transmission based on the weighted first contention window adjustment value.

In some examples of the method, apparatus, or non-transitory computer-readable medium described above, the first parameter comprises hybrid automatic repeat request (HARQ) feedback for one or more transmission opportunities. In some examples of the method, apparatus, or non-transitory computer-readable medium described above, the first contention window adjustment value is based on a number of negative acknowledgement (NACKs) in the HARQ feedback.

In some examples of the method, apparatus, or non-transitory computer-readable medium described above, the first weighting factor is based on whether the HARQ feedback is in a multiplexed mode. Some examples of the method, apparatus, or non-transitory computer-readable medium described above may further include processes, features, means, or instructions for reporting a number of acknowledgement (ACKs) or NACKs in the multiplexed mode, where the first weighting factor is based on the number of NACKs in the HARQ feedback.

In some examples of the method, apparatus, or non-transitory computer-readable medium described above, determining the first contention window adjustment value comprises: determining the first contention window adjustment value using a lookup table, where the lookup table is based on the frame structure of the first transmission. In some examples of the method, apparatus, or non-transitory computer-readable medium described above, the first transmission is in a licensed spectrum.

In some examples of the method, apparatus, or non-transitory computer-readable medium described above, the first parameter is based on a frame structure of the first transmission. In some examples of the method, apparatus, or non-transitory computer-readable medium described above, the first parameter comprises at least one non-reported acknowledgement.

Some examples of the method, apparatus, or non-transitory computer-readable medium described above may further include processes, features, means, or instructions for applying the first weighting factor to the first contention window adjustment value differently for the at least one non-reported acknowledgement than for a reported NACK.

In some examples of the method, apparatus, or non-transitory computer-readable medium described above, the contention widow size corresponds to an uplink (UL) transmission opportunity. Some examples of the method, apparatus, or non-transitory computer-readable medium described above may further include processes, features, means, or instructions for transmitting the first transmission over one or more carriers.

In some examples of the method, apparatus, or non-transitory computer-readable medium described above, determining the first parameter comprises: determining whether a physical uplink control channel (PUCCH) has been successfully decoded. In some examples of the method, apparatus, or non-transitory computer-readable medium described above, the contention window size is adjusted based on whether the UL transmission opportunity is self-scheduled or cross-carrier scheduled. In some examples of the method, apparatus, or non-transitory computer-readable medium described above, the contention window size is different for the one or more carriers.

Some examples of the method, apparatus, or non-transitory computer-readable medium described above may further include processes, features, means, or instructions for receiving a number of negative acknowledgements (NACKs) through hybrid automatic repeat request (HARQ) feedback for each carrier. Some examples of the method, apparatus, or non-transitory computer-readable medium described above may further include processes, features, means, or instructions for determining the first contention window adjustment value based on the number of NACKs for all carriers. Some examples of the method, apparatus, or non-transitory computer-readable medium described above may further include processes, features, means, or instructions for adjusting the contention window size for a second transmission for all carriers, where the contention window size is the same for all carriers.

In some examples of the method, apparatus, or non-transitory computer-readable medium described above, the one or more carriers comprise a primary carrier and one or more secondary carriers, the method further comprising: starting a backoff timer associated with the primary carrier, where the backoff timer applies to the one or more secondary carriers. In some examples of the method, apparatus, or non-transitory computer-readable medium described above, the one or more secondary carriers are within a predetermined frequency separation relative to the primary carrier.

In some examples of the method, apparatus, or non-transitory computer-readable medium described above, the one or more secondary carriers are in an Unlicensed Information Infrastructure radio band. In some examples of the method, apparatus, or non-transitory computer-readable medium described above, a total number of secondary carriers is less than a predetermined number adjusted based on the weighted second contention window adjustment value.

Some examples of the method, apparatus, or non-transitory computer-readable medium described above may further include processes, features, means, or instructions for performing a clear channel assessment based on the contention window size. Some examples of the method, apparatus, or non-transitory computer-readable medium described above may further include processes, features, means, or instructions for applying the first weighting factor to the first contention window adjustment value based on a transmission opportunity corresponding to the first contention window adjustment value.

In some examples of the method, apparatus, or non-transitory computer-readable medium described above, applying the first weighting factor to the first contention window adjustment value comprises: applying a first weighting factor of zero to the first contention window adjustment value for which the corresponding transmission opportunity falls outside a time period. Some examples of the method, apparatus, or non-transitory computer-readable medium described above may further include processes, features, means, or instructions for applying the first weighting factor to the first contention window adjustment value based on an infinite impulse response filter.

Some examples of the method, apparatus, or non-transitory computer-readable medium described above may further include processes, features, means, or instructions for applying the first weighting factor to the first contention window adjustment value based on a user equipment (UE) associated with the first parameter. Some examples of the method, apparatus, or non-transitory computer-readable medium described above may further include processes, features, means, or instructions for applying the first weighting factor to the first contention window adjustment value based on whether a grant associated with the first parameter is a valid grant.

Some examples of the method, apparatus, or non-transitory computer-readable medium described above may further include processes, features, means, or instructions for applying the first weighting factor to the first contention window adjustment value. Some examples of the method, apparatus, or non-transitory computer-readable medium described above may further include processes, features, means, or instructions for applying the first weighting factor to the first contention window adjustment value for the at least one non-reported acknowledgement in the same manner as a reported NACK.

Some examples of the method, apparatus, or non-transitory computer-readable medium described above may further include processes, features, means, or instructions for transmitting the second transmission on a carrier that is different from a carrier of the first transmission. Some examples of the method, apparatus, or non-transitory computer-readable medium described above may further include processes, features, means, or instructions for refraining from resetting the contention window size. In some examples of the method, apparatus, or non-transitory computer-readable medium described above, the first transmission is sent to one or more UEs, the method further comprising: resetting the contention window size.

Some examples of the method, apparatus, or non-transitory computer-readable medium described above may further include processes, features, means, or instructions for resetting the contention window size is based on an elapsed duration after the second transmission. In some examples of the method, apparatus, or non-transitory computer-readable medium described above, determining the first parameter associated with the first transmission further comprises: receiving at least one acknowledgement (ACK) indication from each of the one or more UEs based on the first transmission.

Some examples of the method, apparatus, or non-transitory computer-readable medium described above may further include processes, features, means, or instructions for receiving acknowledgment (ACK) and negative acknowledgement (NACK) indications based on the first transmission. Some examples of the method, apparatus, or non-transitory computer-readable medium described above may further include processes, features, means, or instructions for determining the first parameter associated with the first transmission, where the first parameter comprises a percentage of ACKs relative to a total a number of supported user equipments (UEs).

Some examples of the method, apparatus, or non-transitory computer-readable medium described above may further include processes, features, means, or instructions for applying the first weighting factor to the first contention window adjustment value based on a size of a transmission opportunity or a resource allocation associated with the first parameter. Some examples of the method, apparatus, or non-transitory computer-readable medium described above may further include processes, features, means, or instructions for receiving at least one ACK indication from each of the one or more UEs.

Some examples of the method, apparatus, or non-transitory computer-readable medium described above may further include processes, features, means, or instructions for applying the first weighting factor to the first contention window adjustment value based on a block error rate (BLER) target associated with the first parameter. In some examples of the method, apparatus, or non-transitory computer-readable medium described above, a number of UEs is greater than a threshold, the method further comprising: receiving at least one ACK indication from a predetermined percentage of UEs.

In some examples of the method, apparatus, or non-transitory computer-readable medium described above, the first transmission is sent to one or more UEs, the method further comprising: dividing the one or more UEs into one or more groups of UEs based on the contention window size for the one or more UEs. In some examples of the method, apparatus, or non-transitory computer-readable medium described above, the method further comprising generating randomly a counter for the one or more groups of UEs. Some examples of the method, apparatus, or non-transitory computer-readable medium described above may further include processes, features, means, or instructions for starting the counter for the one or more groups of UEs. Some examples of the method, apparatus, or non-transitory computer-readable medium described above may further include processes, features, means, or instructions for transmitting the second transmission to a group of UEs whose counter expired.

In some examples of the method, apparatus, or non-transitory computer-readable medium described above, the first parameter comprises an interference indication received in a PUCCH. Some examples of the method, apparatus, or non-transitory computer-readable medium described above may further include processes, features, means, or instructions for applying the first weighting factor to the first contention window adjustment value based on a carrier aggregation configuration or a coordinated multipoint configuration.

Some examples of the method, apparatus, or non-transitory computer-readable medium described above may further include processes, features, means, or instructions for choosing randomly a first group of UEs from two or more groups of UEs, where the counter of the two or more groups of UEs is the same value. Some examples of the method, apparatus, or non-transitory computer-readable medium described above may further include processes, features, means, or instructions for transmitting the second transmission to the first group of UEs.

Some examples of the method, apparatus, or non-transitory computer-readable medium described above may further include processes, features, means, or instructions for applying the first weighting factor to the first contention window adjustment value based on whether the first parameter corresponds to a broadcast channel.

Some examples of the method, apparatus, or non-transitory computer-readable medium described above may further include processes, features, means, or instructions for regenerating randomly the counter for the one or more groups of UEs after the second transmission. Some examples of the method, apparatus, or non-transitory computer-readable medium described above may further include processes, features, means, or instructions for applying the first weighting factor to the first contention window adjustment value based on whether the first parameter corresponds to a user equipment (UE) implementing or capable of implementing interference cancellation.

Some examples of the method, apparatus, or non-transitory computer-readable medium described above may further include processes, features, means, or instructions for stopping the counter of the one or more groups of UEs based on the expiration of the counter for the group of UEs whose counter expired. Some examples of the method, apparatus, or non-transitory computer-readable medium described above may further include processes, features, means, or instructions for retaining a value of the counter for the one or more groups of UEs for a third transmission.

In some examples of the method, apparatus, or non-transitory computer-readable medium described above, the contention widow size corresponds to a DL transmission opportunity following one or more DL transmission opportunities corresponding to the first parameter.

A method of wireless communication is described. The method may include transmitting a message to a base station, receiving a contention window size from the base station, wherein the contention window size is calculated using a first weighting factor applied to a first contention window adjustment value based at least in part on the message and performing a clear channel assessment based at least in part on the contention window size.

An apparatus for wireless communication is described. The apparatus may include means for transmitting a message to a base station, means for receiving a contention window size from the base station, wherein the contention window size is calculated using a first weighting factor applied to a first contention window adjustment value based at least in part on the message and means for performing a clear channel assessment based at least in part on the contention window size.

A further apparatus is described. The apparatus may include a processor, memory in electronic communication with the processor, and instructions stored in the memory. The instructions may be operable to cause the processor to transmit a message to a base station, receive a contention window size from the base station, wherein the contention window size is calculated using a first weighting factor applied to a first contention window adjustment value based at least in part on the message and perform a clear channel assessment based at least in part on the contention window size.

A non-transitory computer readable medium for wireless communication is described. The non-transitory computer-readable medium may include instructions to cause a processor to transmit a message to a base station, receive a contention window size from the base station, where the contention window size is calculated using a first weighting factor applied to a first contention window adjustment value based on the message and perform a clear channel assessment based on the contention window size.

In some examples of the method, apparatus, or non-transitory computer-readable medium described above, transmitting the message to the base station comprises: transmitting a bit indicating that at least one transport block in a downlink transmission was successfully decoded, where the contention window size is based on the transmitted bit.

In some examples of the method, apparatus, or non-transitory computer-readable medium described above, transmitting the message to the base station comprises: transmitting a bit indicating that at least one code block in a downlink transmission was successfully decoded, where the contention window size is based on the transmitted bit. In some examples of the method, apparatus, or non-transitory computer-readable medium described above, transmitting the message to the base station includes transmitting data on a physical uplink shared channel (PUSCH).

Some examples of the method, apparatus, or non-transitory computer-readable medium described above may further include processes, features, means, or instructions for detecting a collision during a downlink transmission. Some examples of the method, apparatus, or non-transitory computer-readable medium described above may further include processes, features, means, or instructions for transmitting the message to the base station comprises transmitting a bit indicating the collision, where the contention window size is based on the transmitted bit.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
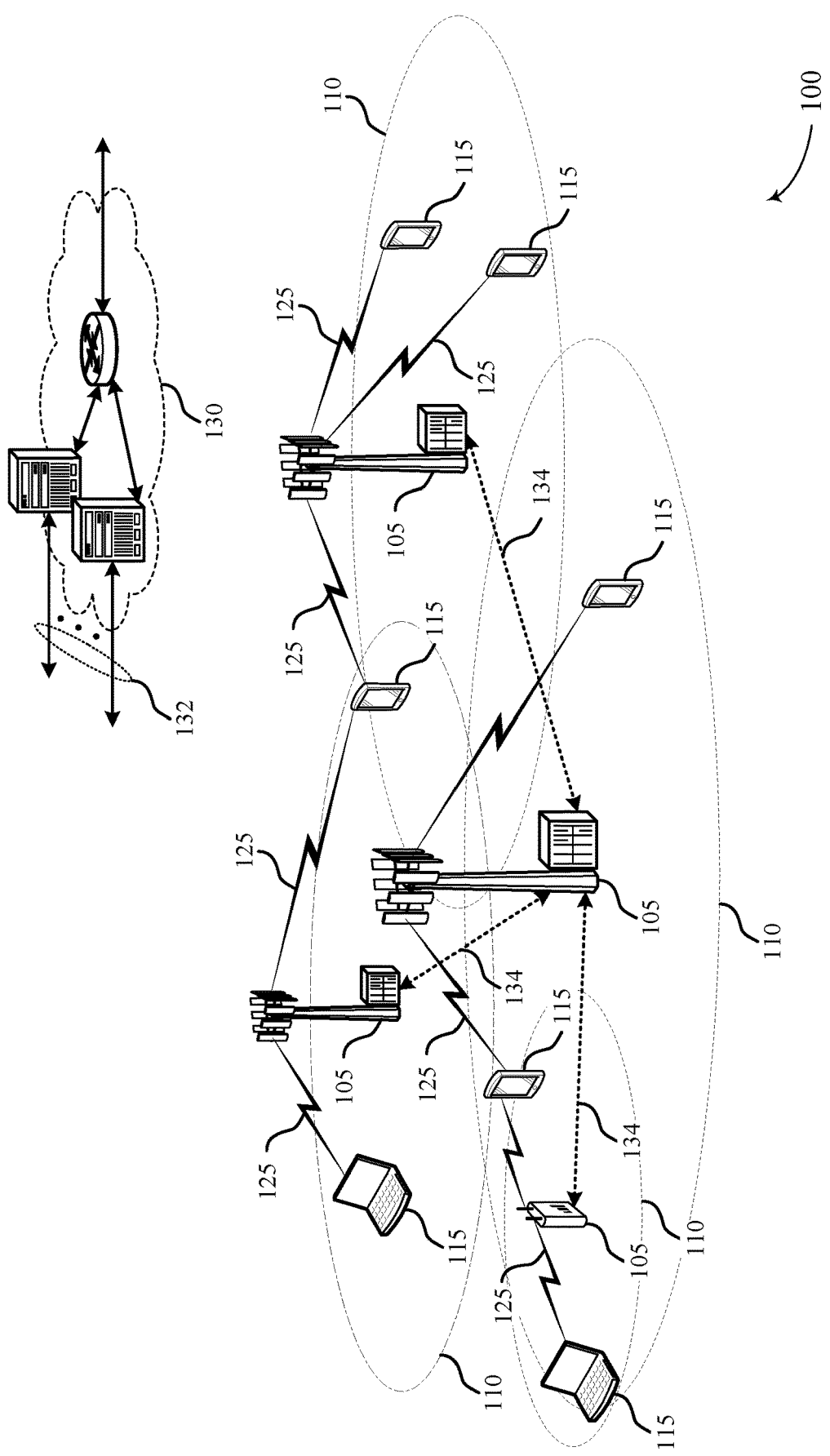
FIG. 1 illustrates an example of a wireless communications system that supports adjustments of CCA window in accordance with aspects of the present disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to specific users (e.g., a licensed radio frequency spectrum band usable for LTE/LTE-A communications). The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

In some wireless systems, devices may monitor the medium or channel for a period of time before sending data in order to prevent collisions. For example, a device may use a clear channel assessment (CCA). If the device senses that the channel is free, it may wait for a backoff period before attempting to transmit. The backoff period may reduce the chance of collisions if multiple devices are attempting to transmit at the same time. In some cases, the backoff period may be randomly chosen up to a predefined maximum value. The maximum backoff period may be known as a contention window (CW).

In some cases, collisions may still occur and the data may not transmit successfully. In such cases, the length of the CW may be increased, which may give more opportunities for multiple devices to successfully transmit. For example, in some cases the CW may double in length for each instance that a transmission is not successful (an exponential backoff) as in wireless local area networks (WLANs). Other methods for determining the length of the CW may be beneficial.

As described herein, the downlink CW may be adapted based on ACK/NACK feedback from previous transmit opportunities (TXOPs). For example, a weighting factor may be applied to adjustment parameters used to determine the CW. Examples of the adjustment parameters may include HARQ feedback, a signal-to-noise ratio, or a determination regarding whether the transmission was successfully decoded. In some cases, the weighting factors may be dynamically implemented based on each of the previous TXOPs. The weighting of each ACK/NACK in the TXOP may depend on a number of factors. In some cases, multiplexed ACK/NACK may have a lower weight than individual ACK/NACK. For multiplexed ACK/NACK, the weighting may depend on the number of multiplexed bits. Or, in addition to the multiplexed ACK/NACK, the UE may indicate the number of ACK or NACK bits as well. The weighting may also depend on whether ACK/NACK is reported or not.

The uplink CW may also be adapted. In some cases, the CW size to be used may be signaled to the UE by base station. Different users may be signaled different values as long as there is a common understanding of transmission boundary. The window size or change in window size may be signaled as part of a common downlink control information grant or in the uplink grant. The adaptation algorithm for the UE window size may re-use applicable concepts from the base station. In some cases, the physical uplink control channel (PUCCH) successful decoding (or unsuccessful decoding) may also be used for window adaptation in addition to the physical uplink shared channel (PUSCH) if PUCCH is error correction encoded, for example, cyclic redundancy check (CRC) encoded. In other cases, the window size may depend on whether the uplink is self-scheduled or cross-carrier scheduled.

Aspects of the disclosure are initially described in the context of a wireless communication system. Specific examples are then described for a clear channel assessment process. These and other aspects of the disclosure are further illustrated by and described with reference to apparatus diagrams, system diagrams, and flowcharts that relate to CCA window adaptation.

FIG. 1 illustrates an example of a wireless communications system 100 that supports adjustments of CCA window in accordance with aspects of the present disclosure. The wireless communications system 100 includes base stations 105, user equipment (UEs) 115, and a core network 130. In some examples, the wireless communications system 100 may be a Long Term Evolution (LTE)/LTE advanced (LTE) network. In some examples, wireless communications system 100 may operate in shared or unlicensed spectrum, such that base stations 105 and UEs 115 perform CCA procedures prior to transmitting on at least one wireless channel. Base stations 105 may determine dynamically changing contention window sizes based on previous uplink (UL) or downlink (DL) transmission opportunities.

A CCA may include an energy detection procedure to determine whether there are any other active transmissions. For example, the device may infer that a change in a received signal strength indicator (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

In general, base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Since communication links 125 may be subject to path loss, interference, and other forms of signal degradation, wireless communications system 100 may employ various means of increasing the reliability of communications. For example, hybrid automatic repeat request (HARQ) is a method of ensuring that data is received correctly over a wireless communication link 125. Hybrid automatic repeat request (HARQ) may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125.

According to the present disclosure, HARQ feedback may also be a means of determining whether a transmission opportunity was the subject to interference from another wireless device on a shared channel. For example, if a base station 105 receives a large number of NACKs, or if the expected HARQ feedback is not received, a base station may infer that there was a transmission collision. As a result, the a contention window for a CCA may be increased.

HARQ feedback may be sent in a physical uplink control channel (PUCCH). PUCCH also be used for scheduling requests (SRs) and channel quality indicators (CQI) and other UL control information. A physical uplink control channel (PUCCH) may be mapped to a control channel defined by a code and two consecutive resource blocks. UL control signaling may depend on the presence of timing synchronization for a cell. PUCCH resources for scheduling request (SR) and channel quality indicator (CQI) reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized. In some cases, a base station may calculate a contention window size based at least in part on whether PUCCH is successfully decoded.

In some cases, wireless communications system 100 may utilize one or more enhanced component carriers (eCCs). An enhanced component carrier (eCC) may be characterized by one or more features including: flexible bandwidth, different transmission time interval (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from downlink (DL) to UL operation for short bursts according to dynamic conditions).

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Thus, a base station 105 may determine a parameter associated with a transmission such as HARQ feedback, a signal-to-noise ratio, or a determination regarding whether the transmission was successfully decoded. The base station 105 may then determine a contention window adjustment value based on the parameter. The base station 105 may then apply weighting factor (e.g., based on the time of the transmission, a number of devices being served, aspects of the transmission parameter, etc.) to the contention window adjustment value. A contention window size for a second transmission may then be adjusted based on the weighted contention window adjustment value (and, in some cases, other weighted adjustments based on other transmissions). The base station 105 may then either perform a clear channel assessment (CCA) based on the contention window size, or may signal the contention window size to a UE 115 that may perform the CCA (e.g., for an uplink transmission).

Figure 2:
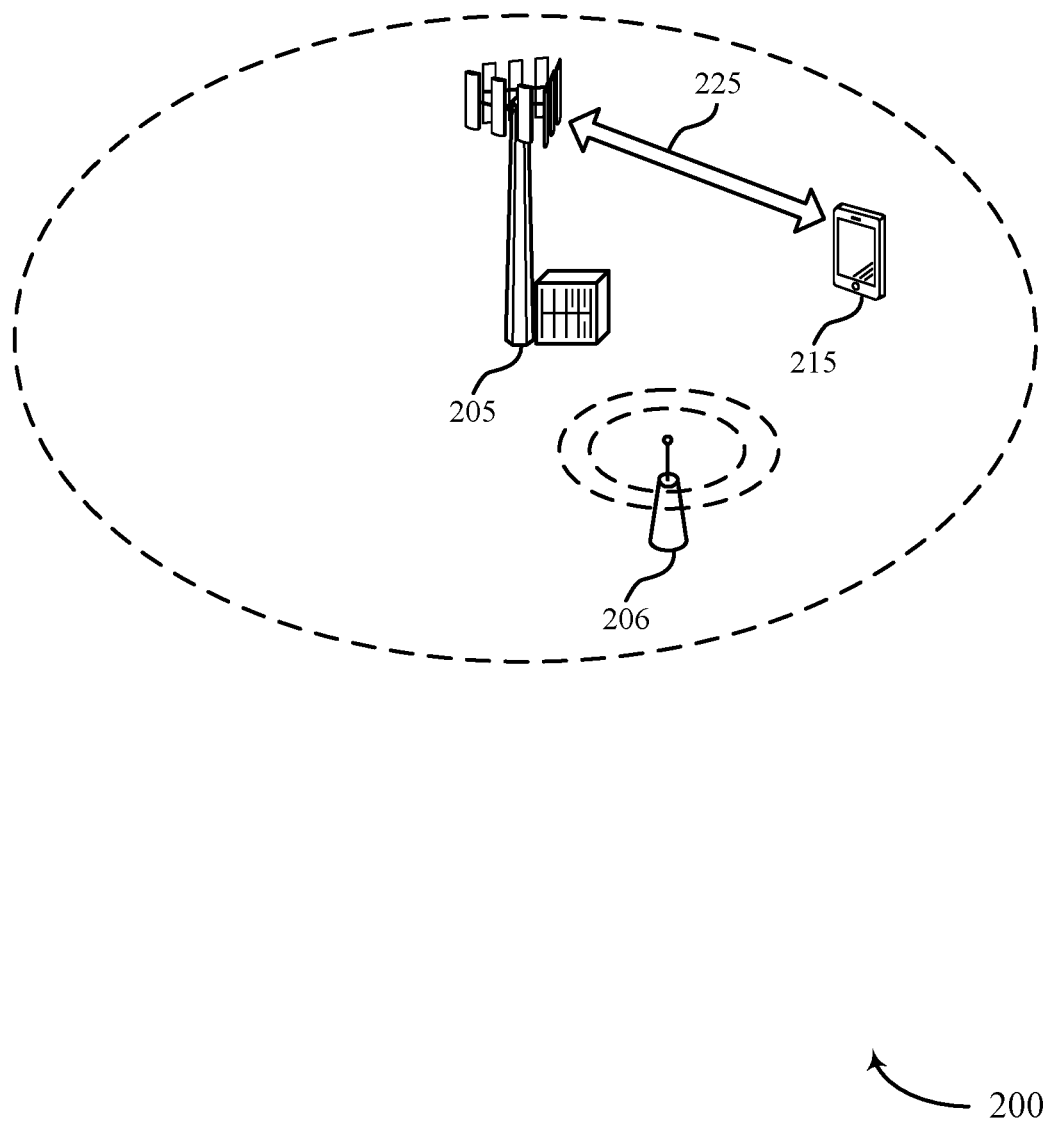
FIG. 2 illustrates an example of a wireless communications subsystem that supports adjustments of CCA window in accordance with aspects of the present disclosure.

FIG. 2 illustrates an example of a wireless communications subsystem 200 that supports adjustments for CCA window in accordance with aspects of the present disclosure. Wireless communications subsystem 200 may include a UE 215, a UE 220, and base station 205, which may be examples of a UE 115 base station 105 described with reference to FIG. 1, and may be communicating using one radio access technology (RAT) system in shared or unlicensed radio frequency spectrum band. For example, UE 215 may communicate with base station 205 over communications link 225, and UE 220 may communication with base station 205 over communications link 230. Wireless communications subsystem 200 may also include wireless device 206, which may be using a different RAT in the same spectrum. For example, wireless device 206 may be a station or access point in a wireless local area network (WLAN). Base station 205 may dynamically adapt a contention window size for the purpose of performing CCA procedures. For example, base station 205 may determine a parameter associated with a first transmission and may determine a contention window adjustment value based at least in part on the parameter. Base station 205 may then apply a weighting factor to the contention window adjustment value and may then adjust the contention window size for a second transmission based at least in part on the weighted first contention window adjustment value.

Base station 205 may monitor the medium or channel for a period of time before sending data in order to prevent collisions, for example, collisions with transmissions from wireless device 206. Base station 205 may use a clear channel assessment (CCA) to sense the channel. If base station 205 senses that the channel is free, it may wait for a backoff period before attempting to transmit. In some cases, the backoff period may be randomly chosen up to a predefined maximum value. The maximum backoff period may be known as a contention window (CW). In some cases, collisions may still occur and the data may not transmit successfully. In such cases, the length of the CW may be increased, which may give more opportunities for multiple devices to successfully transmit.

In addition to channel contention procedures, wireless systems may have different processes for acknowledgment/negative acknowledgment (ACK/NACK) of data transmissions. These procedures may differ for different radio access technologies (RATs). For example, in WLAN, ACK/NACK may occur instantaneously after transmissions, block ACK may be possible, ACK may not be subject to listen before talk (LBT), ACK/NACK may not be multiplexed, and there may be only one ACK/NACK bit for each core block. In other wireless systems, for example, cellular wide area network systems, ACK/NACK may lag in time from the end of the transmission, each transport block may be acknowledged in a separate subframe in the primary cell, the ACK may be subject to LBT (e.g., if transmitted on a secondary cell), ACK/NACK may be partially multiplexed, and the ACK/NACK may depend on carrier aggregation.

Different wireless systems may also have different methods for handling multiple users. For example, in WLAN, multiple users may be accommodated by spatial multiplexing, whereas in other wireless systems, such as cellular wide area network systems, multiplexing may be accomplished by time division multiplexing (TDM), frequency division multiplexing (FDM), spatial multiplexing, or any combination thereof. Carrier priority may also depend on the type of wireless system. For example, in WLAN, carrier sense multiple access (CSMA) may be performed only on the primary carrier and CCA may be performed on secondary carriers, whereas in some cellular networks, each carrier may perform CCA independently. In some cases, outer loop power control management may differ for different wireless systems. For example, in WLAN, the limited number of users may help with limiting the backoff, whereas in cellular systems, running outer loop at high block error ratio (BLER) may result in errors. Also, different wireless systems may have different hybrid automatic repeat request (HARQ) capabilities, different ACK/NACK procedures for broadcast packets, or different coordinated multipoint (CoMP) capabilities. For example, in WLAN, HARQ may not be performed, broadcast packets may be sent by beacon and may not be acknowledged, and CoMP may not be supported. In the case of cellular networks, they may use HARQ, may not ACK/NACK broadcast channels, and may support CoMP.

As described herein, the downlink CW may be adapted based on ACK/NACK feedback from UE 215 from previous transmit opportunities (TXOPs). For example, base station 205 may apply a weighting factor to each adjustment parameter used to determine the CW. In some cases, the weighting factors may be dynamically implemented based on each of the previous TXOPs. In one possible case, the weighting may be based on the number of ACK/NACKs received from UE 215 in a window of time corresponding to the previous Nms or previous N TXOPs, where any earlier ACK/NACKS may be discarded. In this case, N may be a predetermined variable. In another example, the weighting may be based on a filtering algorithm such as an infinite impulse response (IIR) filter. For example, the CW width at an upcoming transmit opportunity may be given by:

$$CW[TXOP(M+1)] = CW[TXOP(M)] + (1-x) \cdot CW_{adjustment},\quad(1)$$

$$x = CW[TXOP(M)]. \quad(2)$$

That is, where, CW[TXOP(M)] is the CW width for the current TXOP, x is the window size at M relative to some maximum window size, and CW adjustment is a CW adjustment factor, which may depend on one or more factors described here. In some cases, if base station 205 is idle for a configured period of time without accessing the channel, the CW may be reset; for example, to a minimum value.

As discussed, the contention window size may be a function of a number of parameters, including the number of ACK or NACKs received. In some cases, the number of ACK or NACKs received at base station 205 within a defined observation period may be used to determine how to adjust the contention window size. The duration of the observation period may depend on a number of factors. For example, the duration may be fixed. In other examples, the duration may depend on the frame structure used for transmissions. If multiple carriers are used, then the duration may depend on the frame structure of the primary cell. For example, for one frame structure, the time period may begin at n+4 ms after the transmission starts on the secondary cell and may end at n+4 ms after the transmission ends. Or, for example, a table may be used to define the observation period for each possible frame structure, e.g., each TDD frame structure. If there are no ongoing transmissions, then the contention window size may be adjusted based on the last available observation period. In some cases, the contention window size may be reset to an initial size if there is no ongoing transmissions for some duration of time, which may be predetermined.

In some cases, communication may occur over multiple carriers and feedback may be received for each carrier. For example, communication link 225 may constitute multiple carriers. The contention window size may be adjusted independently for each carrier or may be adjusted based on the feedback from all carriers. For example, if listen before talk (LBT) each carrier independently performs, then the contention window size may be determined independently, which may depend on the ACK/NACKs received for that carrier. Or, the contention window size may be determined based on the ACK/NACKs received for all carriers, where the resulting contention window size is then used for all carriers. In such cases, the countdown of the backoff timer may still be independent for each carrier. In other examples, a primary carrier may perform the countdown on behalf of other carriers, for example, secondary carriers. In such cases, the contention window size may be determined based on the ACK/NACK feedback received for all carriers. In some cases, limits may be placed on what constitutes a secondary carrier. For example, limits may be applied to the frequency separation between primary and secondary carriers. Or, a limit may be placed on the total number of secondary carriers that is associated with a primary carrier. In other cases, the secondary carriers may be restricted to specific sub-bands, for example, Unlicensed Information Infrastructure (U-NII) radio bands.

In some instances, multiple groups of carriers may exist, each having a primary carrier. Base station 205 may switch carriers for the next transmission. If so, the contention window size may not be reset. For example, if retransmission occurs on a different carrier, the contention window size may not be reset in order to maintain consistent contention window size updates.

The weighting of each ACK/NACK in the TXOP may depend on a number of factors. In some cases, multiplexed ACK/NACK may have a lower weight than individual ACK/NACK sent by UE 215. For multiplexed ACK/NACK, the weighting may depend on the number of multiplexed bits. Or, in addition to the multiplexed ACK/NACK, UE 215 may indicate the number of ACK or NACK bits as well. The weighting may also depend on whether ACK/NACK is reported or not. For example, if UE 215 does not report ACK/NACK, this may indicate that the control channel was not decoded, which may indicate a more serious issue than a NACK report. Because a NACK is not reported, base station 205 may inherently know that a discontinuous transmission (DTX) occurred. In some cases, the DTX may be treated the same as the NACK. In other cases, it may be treated differently, e.g., the DTX may be weighted more heavily compared to a NACK. In other cases, UE 215 may decode the packet header but fail to decode any media access control protocol data units (MPDUs), which may be treated as a DTX scenario. In other cases, ACK/NACK based on invalid grants transmitted by base station 205, e.g., during cross carrier scheduling, may be discarded for CW weighting considerations. For example, such grants may be discarded based on channel usage beacon signals (CUBS) detection.

In some cases, UE 215 may not be able to transmit ACK/NACKs for previous transmissions because the carrier is occupied. For example, UE 215 may perform LBT and determine that the carrier is occupied and not transmit. Thus, base station 205 may not receive the feedback needed to determine the contention window size. If LBT fails for UE 215, then base station 205 may refrain from using the missing ACK/NACKs for computing the window size. In some cases, the observation period for receiving ACK/NACKs may be redefined when ACK/NACKS are transmitted on unlicensed carriers, which may help ensure that all reported ACK/NACKs are utilized.

The number of users in wireless communications subsystem 200 and the size of the TXOP may also affect the weighting. For example, a user with fewer resource blocks worth of data may have less influence on the CW adaptation compared to another user with more resource blocks allocated per subframe. In this case, ACK/NACK results of all users may be weighted for CW adaptation. For example, the number of allocated resource blocks may be used for the weighting. In another case, the outer loop BLER target of each user may be considered when adjusting its contribution to the change in the CW size. For example, a user with an outer loop BLER target of 30% may have more decode failures than a user with an outer loop BLER target of 10%.

The following discussion presents a number of non-limiting options in which the contention window size may be determined or modified. In a first option, the contention window size may be doubled when NACKs are reported for all transmissions within the observation period. For example, UE 215 and UE 220 would report NACKs for all subframes on all carriers. This option may not be preferable because it offers a number of ways prevent the contention window size from being increased. In a second option, the contention window size may be reset if each of UE 215 and UE 220 report at least one ACK, i.e., if one UE, e.g., UE 215, reports all NACKs, then the contention window size increases. This may, for example, reduce the incentive for base station 205 to schedule a low modulation and coding scheme (MCS) for one user in order to not increase its contention window size.

In a third option, the contention window size may be reset if a percentage of received ACKs received within the observation period exceeds a configured threshold value. In some cases, the threshold value may be 50%. In some aspects, ACKs or the threshold value may be weighted based on the number of resource blocks allocated for the grant, which may discourage base station 205 from transmitting a small number of resource blocks to UE 215 and UE 220 to meet the threshold. In other aspects, weighting may be based on the difference between a reported channel quality indicator (CQI) and a preferred CQI, or the difference between the reported MCS and the MCS used for the transmission. For example, if the MCS used for the transmission is greater than the reported MCS, then the relative weight may be lowered and vice versa.

In a fourth option, some combination of options two and three may be used. For example, the contention window size may be reset if both UE 215 and UE 220 report at least one ACK, and the percentage of ACKs exceeds some threshold. Some aspects of option four may depend on the number of scheduled UEs. For example, if the number of scheduled UEs exceeds a threshold, e.g., four UEs, then instead of all UEs reporting at least one ACK, some percentage of UEs report at least one ACK.

In a fifth option, the contention window size may be set for each UE by base station 205, e.g., for both UE 215 and UE 220. In some aspects, the set of UEs may be divided into groups based on their current contention window size. For example, UE 215 may represent one group and UE 220 may represent a second group. Then, a random number may be generated for each group of UEs, wherein the number corresponds to the backoff timer. When the backoff timer expires for one of the groups (the group with the lowest number initially), base station 205 may transmit to that group of UEs. If two groups have the same number, then base station 205 may randomly choose one of the groups to transmit to. In one aspect, every group of UEs may have a new number generated after a transmission. In a different aspect, the timers may be stopped for the other groups of UEs when the transmission occurs, and the value of the timer when it is stopped may be retained and used for the subsequent transmission.

In order to help implement the above techniques or options, UE 215 may report various types of feedback to base station 205 based on previous transmissions. In some cases, UE 215 may report ACK/NACK feedback without bundling. In other cases, it may bundle the ACK/NACK feedback, which may result in reporting a NACK even if one or more PDSCH transmissions, i.e., transport blocks, were successfully decoded. In such instances, UE 215 may transmit a bit to indicate that at least one ACK exists, even if the bundled feedback results in a NACK. Or, a bit may be sent to indicate if any code blocks were successfully decoded, which base station 205 may use to modify the contention window size.

The downlink CW adaptation may also depend on collision detection and reporting by UE 215. For example, UE 215 may detect a drop in signal-to-interference-plus-noise ratio (SINR) in a given subframe and may report to base station 205 using, for example, one bit on the physical uplink control channel (PUCCH). In some cases, this bit may be used as an input for the CW adaptation algorithm. In other cases, the CW may be adapted in order to reduce the variation in CW size across carriers or across transmission points for CoMP. For example, ACK/NACK results for all carriers may be used to adjust the CW size.

In some cases, broadcast channels may not be considered for CW adaptation. For example, wireless communications subsystem 200 may only transmit evolved multimedia broadcast multicast service (eMBMS), at which point the CW adaptation may consider other metrics such as the number of interferers for adaptation (e.g., UE 215 reporting based or base station 205 sensing based determination of the number of interferers). In other cases, the window adaptation may use different weights to adjust the contributions of users who may perform different levels of interference cancellation, for example, in non-orthogonal multiple access (NOMA) or superposition coding. In another case, if UE 215 has interference cancellation (IC) capable receivers, different weights may be applied. This may involve UE 215 signaling its IC capability to base station 205.

The uplink CW may also be adapted. In some cases, the CW size to be used may be signaled to UE 215 by base station 205. Different users may be signaled different values as long as there is a common understanding of transmission boundary. The window size or change in window size may be signaled as part of a common downlink control information grant or in the uplink grant. The adaptation algorithm for UE 215 CW size may re-use applicable concepts from base station 205. In some cases, PUCCH successful decoding (or unsuccessful decoding) may also be used for window adaptation in addition to the physical uplink shared channel (PUSCH) if PUCCH is error correction encoded, for example, cyclic redundancy check (CRC) encoded. In other cases, the window size may depend on whether the uplink is self-scheduled or cross-carrier scheduled.

Figure 3:
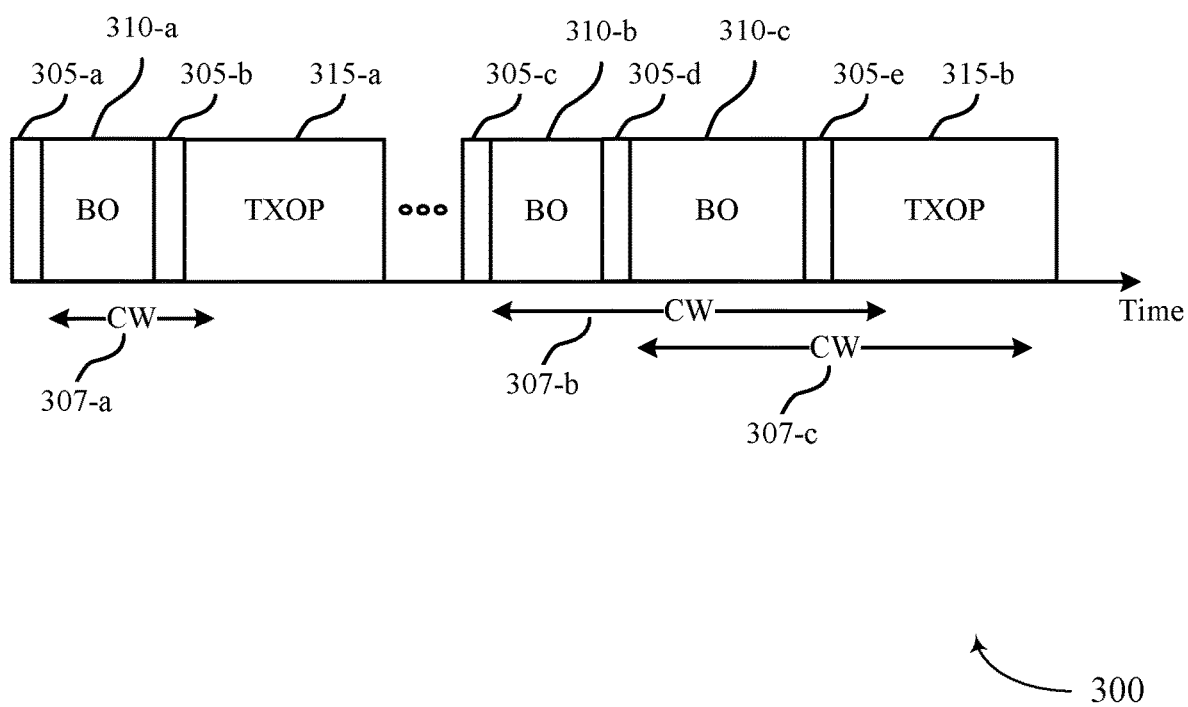
FIG. 3 illustrates an example of a contention window adaptation in accordance with aspects of the present disclosure.

FIG. 3 illustrates an example of a contention window adaptation 300 in accordance with aspects of the present disclosure. Contention window adaptation 300 may be utilized by a UE 115 and base station 105 described with reference to FIGS. 1-2. That is, contention window adaptation 300 represents an example of a base station 105 adapting the contention window based on a preceding transmission opportunity. In some cases, the adaptation may be based on multiple previous transmission opportunities, uplink and downlink opportunities and transmission opportunities of multiple different UEs 115.

In some cases, base station 105 may monitor the medium or channel for a period of time before sending data in order to prevent collisions. If base station 105 senses that the channel is free, it may wait for a backoff period 310 before attempting to transmit. In some cases, the backoff period 310 may be randomly chosen up to a predefined maximum value. The maximum backoff period may be known as a contention window (CW). In some cases, collisions may still occur. In such cases, the length of the CW may be increased, which may give more opportunities for multiple devices to successfully transmit.

Time period 305-a,b,c,d,e may represent base station 105 performing a carrier sense. If base station 105 determines that the carrier is available at time period 305-a, it may enter a backoff period. Backoff periods 310-a, 310-b, and 310-c may represent the periods following a detection of a transmission conflict. This backoff period may be randomly chosen from a range of values, which may be represented by contention window 307-a, 307-b, and 307-c. That is, backoff period 310-a may be less than or equal to contention window 307-a. When backoff period 310-a expires, base station 105 may perform a carrier sense at time period 305-b. If the carrier is available, it may then transmit. Transmission opportunities 315-a and 315-b may represent this period available for transmission.

After the transmission, base station 105 may adjust the contention window size. This adjustment may depend on a number of factors describe in this disclosure, for example but not limited to, the number of NACKs received from UE 115. For the following transmission, base station 105 may again sense the medium in time period 305-c and enter backoff period 310-b if the carrier is available. Contention window 307-b may be the maximum possible backoff period and may be adjusted from the previous transmission. After backoff period 310-b expires, base station 105 may again sense the carrier at time period 305-d. If the carrier is busy, it may enter backoff period 310-c. When backoff period 310-c expires, base station 105 may again sense the carrier at time period 305-e. If the carrier is free, it may then transmit in transmission opportunity 315-b.

Figure 4:
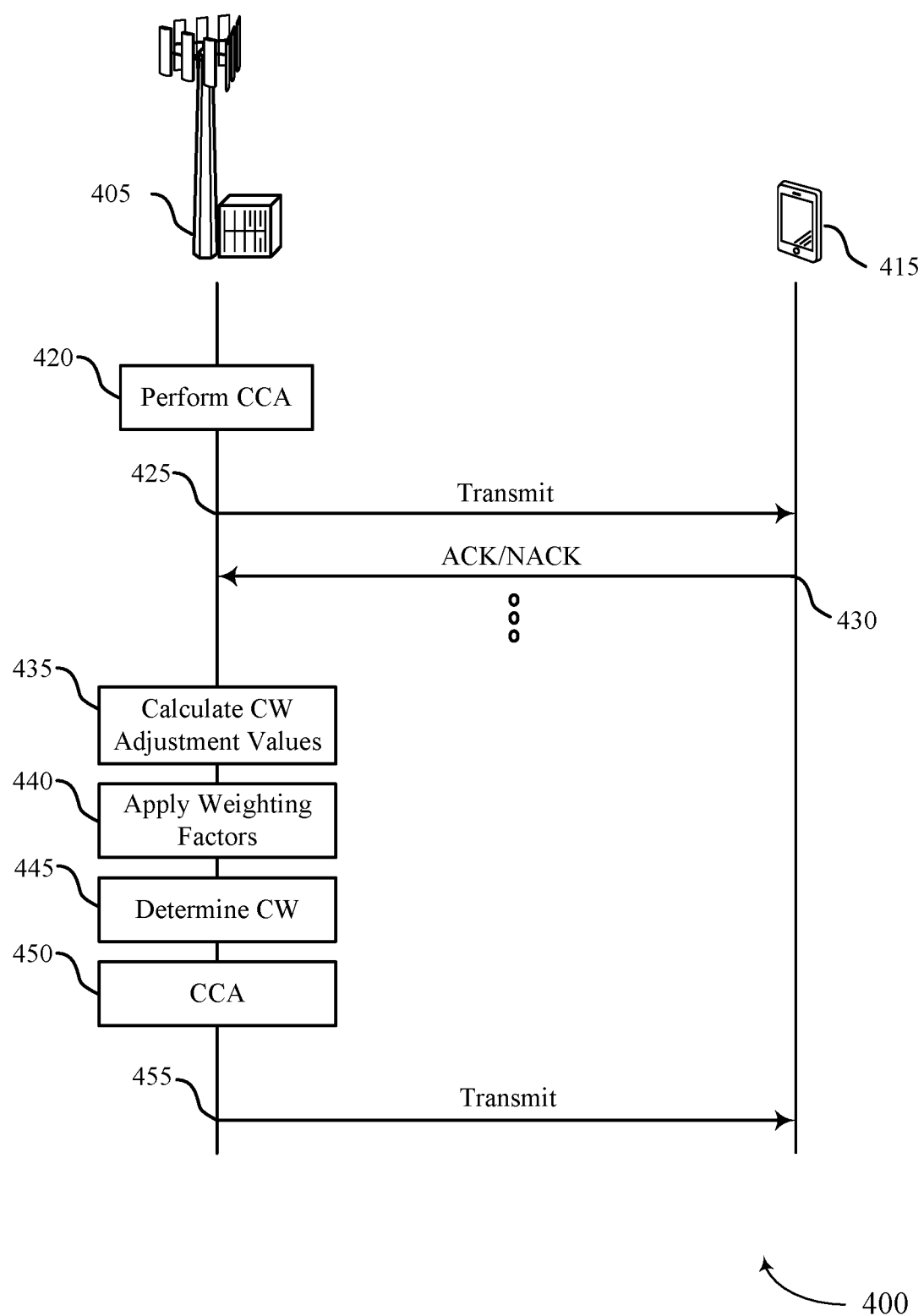
FIG. 4 illustrates an example of a process flow that supports adjustments of CCA window in accordance with aspects of the present disclosure.

FIG. 4 illustrates an example of a process flow 400 that supports adjustments of CCA window in accordance with aspects of the present disclosure. Process flow 400 may include a UE 415 and base station 405, which may be examples of a UE 115 and base station 105 described with reference to FIG. 1 and may be examples of a UE 215 and base station 205 described with reference to FIG. 2. In some examples, UE 415 may represent multiple UEs.

At 420, base station 405 may perform a clear channel assessment based on the contention window size. At 425, base station 405 may transmit a message to UE 415. In some cases, the transmission at 425 may be over one or more carriers. For example, there may be a primary carrier and one or more secondary carriers. In some cases, the one or more secondary carriers may be within a predetermined frequency separation relative to the primary carrier. Additionally, the one or more secondary carriers may be in an Unlicensed Information Infrastructure radio band, or the total number of secondary carriers may be less than a predetermined number.

At 430, UE 415 may transmit a message to base station 405 that may contain ACK/NACK for the previous transmission. In some examples, transmitting the message to the base station may include transmitting HARQ feedback in response to a DL transmission. The data may be transmitted on a physical uplink shared channel (PUSCH). UE 415 may report a number of ACKs or NACKs in the multiplexed mode. In some cases, HARQ feedback may be received for each carrier. In some examples, UE 415 may transmit a bit indicating that at least one transport block in a downlink transmission was successfully decoded. In other examples, UE 415 may transmit a bit indicating that at least one code block in a downlink transmission was successfully decoded. In further examples, UE 415 may transmit a bit indicating a collision occurred during the transmission at 425.

At 435, base station 405 may determine a first parameter associated with a first transmission and may determine a first contention window adjustment value based on the first parameter. In some examples the first parameter includes HARQ feedback for one or more transmission opportunities. In some examples the first parameter includes at least one non-reported acknowledgement. In some examples determining the first parameter includes: determining whether a PUCCH has been successfully decoded. Thus, the first parameter may be used by base station 405 as an indication that a collision may have occurred with another device using the shared spectrum. In other examples, the first parameter is based on a frame structure of the first transmission, where, in some cases, the first transmission is in a licensed spectrum. In some cases, the first parameter may be determined by using a lookup table, where the lookup table may be based on the frame structure of the first transmission.

At 440, base station 405 may apply a first weighting factor to the first contention window adjustment value. In some examples the first weighting factor is based at least in part on whether the HARQ feedback is in a multiplexed mode. (such that the first weighting factor may be based on the number of acknowledgement (ACKs) or NACKs in the multiplexed mode). The base station 405 may apply the first weighting factor to the first contention window adjustment value differently for the a non-reported acknowledgement than for a reported NACK, or it may be applied in the same manner. The base station 405 may apply the first weighting factor to the first contention window adjustment value based on a transmission opportunity corresponding to the first contention window adjustment value. In some cases, the first weighting factor is based at least in part on a reported channel quality indicator (CQI) compared to a preferred CQI.

In some examples applying the first weighting factor to the first contention window adjustment value includes: applying a first weighting factor of zero to the first contention window adjustment value for which the corresponding transmission opportunity falls outside a time period. In some cases, the base station 405 may apply the first weighting factor to the first contention window adjustment value based on an infinite impulse response filter. Base station 405 may apply the first weighting factor to the first contention window adjustment value based on a user equipment (UE) associated with the first parameter.

Base station 405 may apply the first weighting factor to the first contention window adjustment value based on whether a grant associated with the first parameter may be a valid grant. In some cases, base station 405 may apply the first weighting factor to the first contention window adjustment value based on a number of supported UEs. In some cases, base station 405 may apply the first weighting factor to the first contention window adjustment value based on a size of a transmission opportunity or a resource allocation associated with the first parameter. In some cases, base station 405 may apply the first weighting factor to the first contention window adjustment value based on a block error rate (BLER) target associated with the first parameter. In some examples the first parameter includes an interference indication received in a PUCCH.

Base station 405 may apply the first weighting factor to the first contention window adjustment value based on a carrier aggregation configuration or a coordinated multi-point configuration. In some cases, base station 405 may apply the first weighting factor to the first contention window adjustment value based on whether the first parameter corresponds to a broadcast channel. In some cases, base station 405 may apply the first weighting factor to the first contention window adjustment value based on whether the first parameter corresponds to a UE implementing or capable of implementing interference cancellation. In some examples the contention widow size corresponds to a DL transmission opportunity following one or more DL transmission opportunities corresponding to the first parameter.

At 445, base station 405 may determine a contention window size for a second transmission based on the weighted first contention window adjustment value. In some examples the first contention window adjustment value is based at least in part on a number of NACKs in the HARQ feedback. In some examples the contention window size is adjusted based at least in part on whether the UL transmission opportunity is self-scheduled or cross-carrier scheduled. In other examples, the contention window size may be adjusted for each carrier, which may be based on the number of NACKs received on each carrier. In other cases, the contention window size may be adjusted for all carriers, where the adjustment depends on the the ACK/NACKs received for all carriers.

In some cases, base station 405 may determine a second parameter associated with a second transmission and may determine a second contention window adjustment value based at least in part on the second parameter. Base station 405 may apply a second weighting factor to the second contention window adjustment value, such that the contention window size is adjusted based at least in part on the weighted second contention window adjustment value.

In some cases, the contention window size may be reset. This may be based at least in part on an elapsed duration after a transmission. In other cases, the window size may be reset if base station 405 received at least one ACK indication from each of the one or more UEs 415 at 430. In other cases, the window size may be reset if a percentage of ACKs relative to a total number of ACKs and NACKs received is above a threshold. Or, if the number of UEs is greater than some threshold, the contention window size may be reset if at least one ACK indication is received from a predetermined percentage of UEs.

At 450, base station 405 may perform a clear channel assessment based on the contention window size. In some examples, base station 405 may not perform the CCA but may transmit the contention window size to UE 415 prior to the UL transmission opportunity and UE 415 may perform a CCA based on the window size (e.g., for an UL transmission). In some cases, base station 405 may start a backoff timer, which may be associated with a primary carrier and may apply to all secondary carriers. In some examples, base station 405 may transmit to multiple UEs 415. In such cases, base station 405 may divide the one or more UEs 415 into one or more groups based on the contention window size for the one or more UEs 415, randomly generate a counter for the one or more groups of UEs 415, and start the counter.

At 455, base station 405 may transmit to UE 415. In some cases, the transmission at 455 may depend on the expiration of a counter or backoff timer. In some examples, base station 405 may randomly regenerate the counter for the one or more groups of UEs 415 after the transmission. In other examples, base station 405 may retain the value of the counter for the one or more groups of UEs 415 when the transmission at 455 occurs. In other examples, if the transmission at 455 is on a different carrier than the transmission at 425, base station 405 may refrain from resetting the contention window size.

Figure 5:
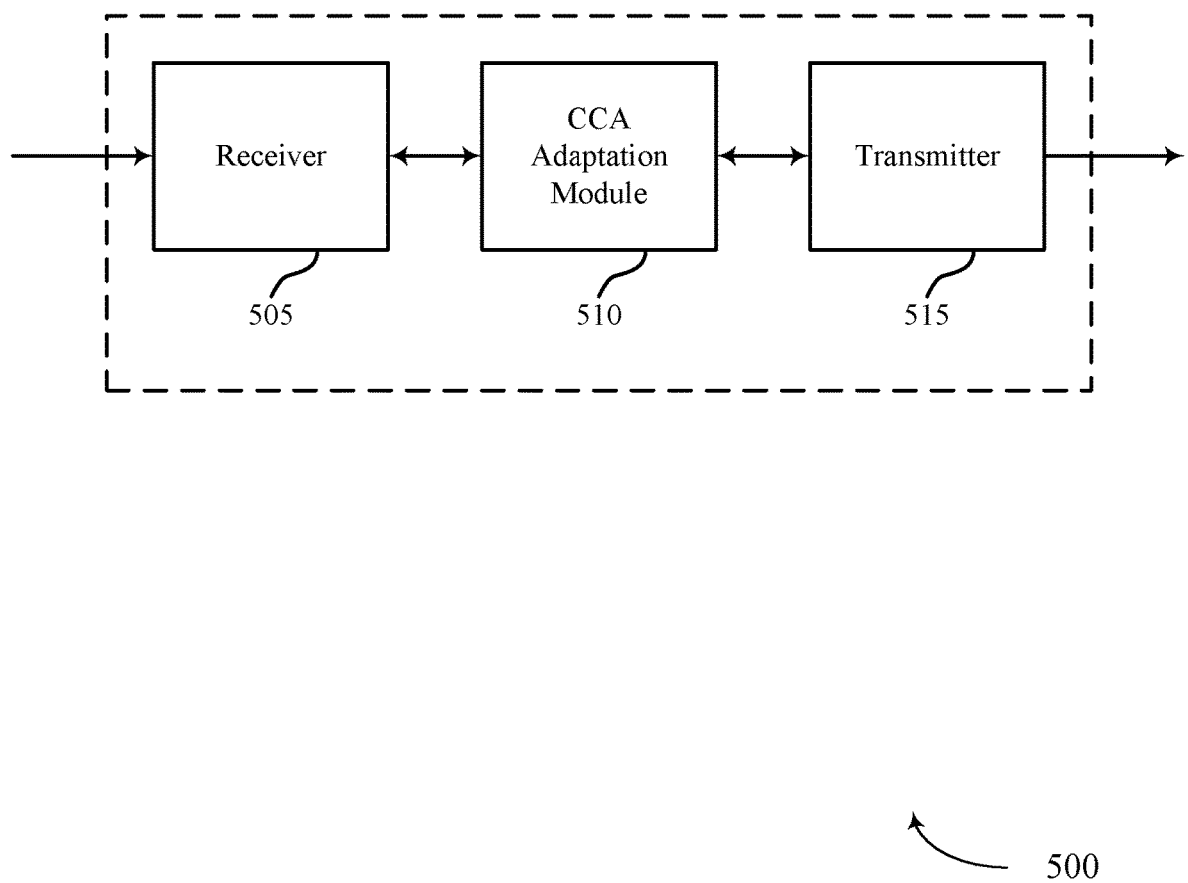
FIGS. 5 and 6 show block diagrams of a wireless device that supports CCA window adaptation in accordance with aspects of the present disclosure.

FIG. 5 shows a block diagram of a wireless device 500 that supports CCA window adaptation in accordance with aspects of the present disclosure. Wireless device 500 may be an example of aspects of a UE 115 described with reference to FIGS. 1-4. Wireless device 500 may include a receiver 505, a CCA adaptation component 510, or a transmitter 515. Wireless device 500 may also include a processor. Each of these components may be in communication with each other.

The receiver 505 may receive information such as packets, user data, or control information associated with various information channels (e.g., control channels, data channels, and information related to CCA window adaptation, etc.). Information may be passed on to the CCA adaptation component 510, and to other components of wireless device 500.

The CCA adaptation component 510 may transmit a message to a base station, receive a contention window size from the base station, such that the contention window size is calculated using a first weighting factor applied to a first contention window adjustment value based at least in part on the message, and perform a clear channel assessment based at least in part on the contention window size.

The transmitter 515 may transmit signals received from other components of wireless device 500. In some examples, the transmitter 515 may be collocated with the receiver 505 in a transceiver component. The transmitter 515 may include a single antenna, or it may include a plurality of antennas.

Figure 6:
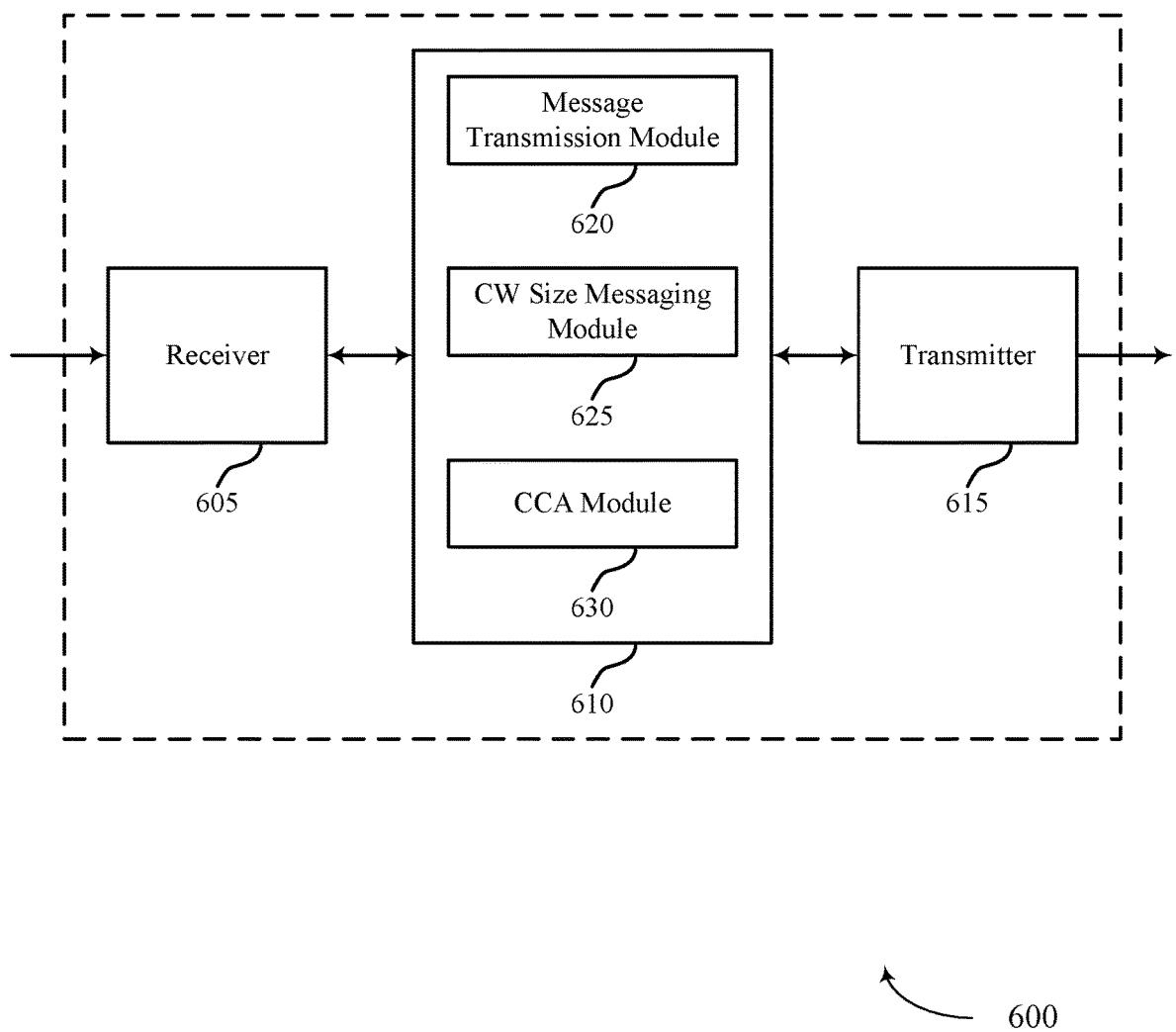

FIG. 6 shows a block diagram of a wireless device 600 that supports CCA window adaptation in accordance with aspects of the present disclosure. Wireless device 600 may be an example of aspects of a wireless device 500 or a UE 115 described with reference to FIGS. 1-5. Wireless device 600 may include a receiver 605, a CCA adaptation component 610, or a transmitter 615. Wireless device 600 may also include a processor. Each of these components may be in communication with each other. The CCA adaptation component 610 may also include a message transmission component 620, a CW size messaging component 625, and a CCA component 630.

The receiver 605 may receive information which may be passed on to CCA adaptation component 610, and to other components of wireless device 600. The CCA adaptation component 610 may perform the operations described with reference to FIG. 5. The transmitter 615 may transmit signals received from other components of wireless device 600.

The message transmission component 620 may transmit a message to a base station as described with reference to FIGS. 2-4. In some examples, transmitting the message to the base station includes transmitting HARQ feedback in response to a DL transmission, such that the contention window size may be based at least in part on the HARQ feedback. In some examples, transmitting the message to the base station includes transmitting data on a PUSCH. In some examples, transmitting the message to the base station includes transmitting a bit indicating that at least one transport block in a downlink transmission was successfully decoded or transmitting a bit indicating that at least one code block in a downlink transmission was successfully decoded or transmitting a bit indicating that a collision occurred in the previous downlink transmission.

The CW size messaging component 625 may receive a contention window size from the base station, such that the contention window size is calculated using a first weighting factor applied to a first contention window adjustment value based at least in part on the message as described with reference to FIGS. 2-4.

The CCA component 630 may perform a clear channel assessment based at least in part on the contention window size as described with reference to FIGS. 2-4.

Figure 7:
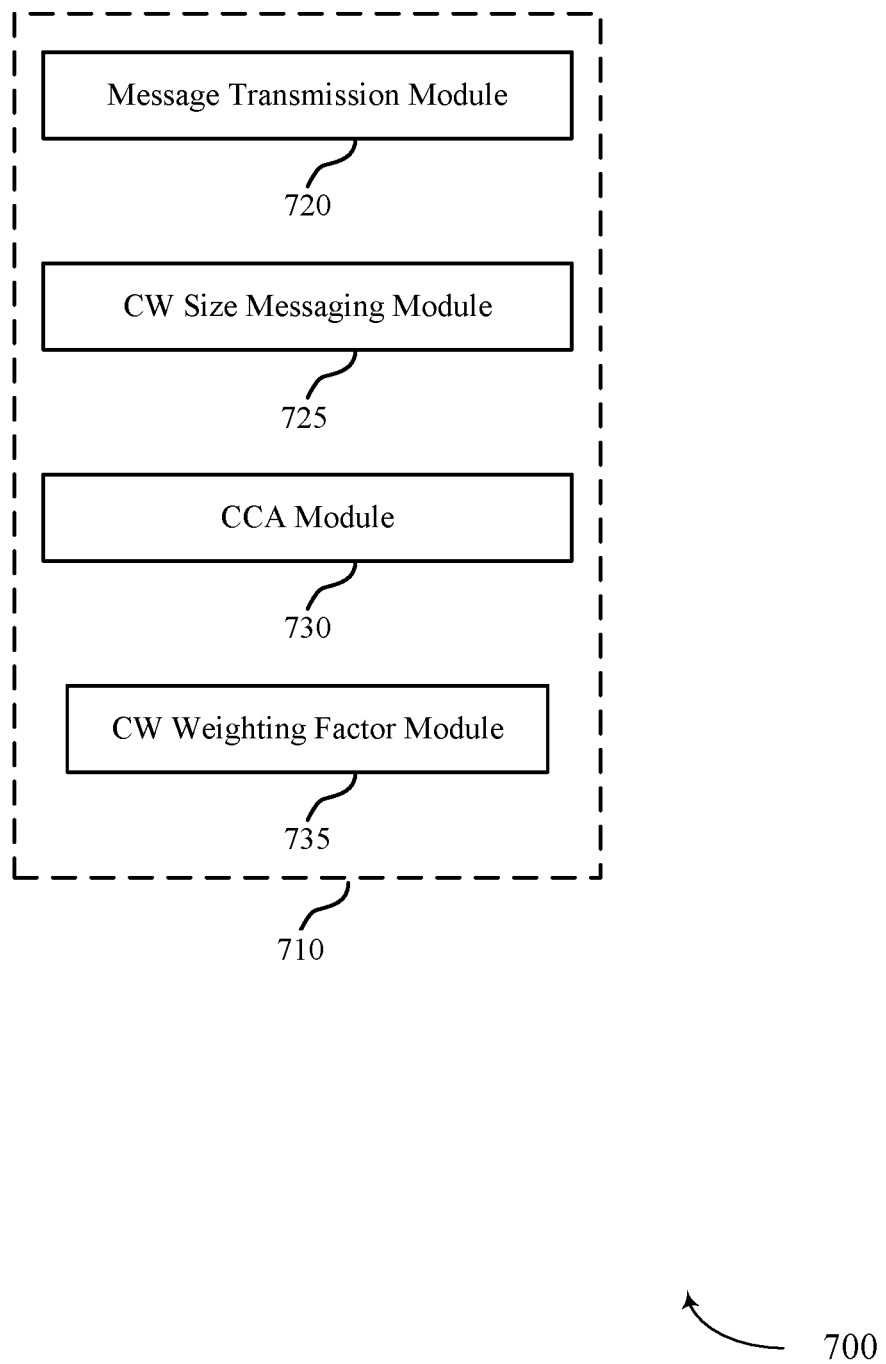
FIG. 7 shows a block diagram of a CCA adaptation component which may be a component of a wireless device for CCA window adapation in accordance with aspects of the present disclosure.

FIG. 7 shows a block diagram 700 of a CCA adaptation component 710 which may be a component of a wireless device 500 or a wireless device 600 for CCA window adaptation in accordance with aspects of the present disclosure. The CCA adaptation component 710 may be an example of aspects of a CCA adaptation component 510 described with reference to FIGS. 5-6. The CCA adaptation component 710 may include a message transmission component 720, a CW size messaging component 725, and a CCA component 730. Each of these components may perform the functions described with reference to FIG. 6. The CCA adaptation component 710 may also include and a CW weighting factor component 735.

The CW weighting factor component 735 may be configured such that the first weighting factor may be applied to the first contention window adjustment value based at least in part on a transmission opportunity corresponding to the first contention window adjustment value as described with reference to FIGS. 2-4. In some examples, the first weighting factor may be applied to the first contention window adjustment value based at least in part on a carrier aggregation configuration or a coordinated multipoint configuration. In some examples, the first weighting factor may be applied to the first contention window adjustment value based at least in part on a number of supported UEs. In some examples, the first weighting factor may be applied to the first contention window adjustment value based at least in part on an interference cancellation capability.

In some examples, the first weighting factor may be based at least in part on whether the HARQ feedback may be in a multiplexed mode. The CW weighting factor component 735 may also report a number of ACKs or NACKs in the multiplexed mode, such that the first weighting factor is based on the number. The CW weighting factor component 735 may also apply the first weighting factor to the first contention window adjustment value differently for the at least one non-reported acknowledgement than for a reported NACK. The CW weighting factor component 735 may also apply the first weighting factor to the first contention window adjustment value based on a transmission opportunity corresponding to the first contention window adjustment value.

In some examples, applying the first weighting factor to the first contention window adjustment value includes applying a first weighting factor of zero to the first contention window adjustment value for which the corresponding transmission opportunity falls outside a time period. The CW weighting factor component 735 may also apply the first weighting factor to the first contention window adjustment value based on an infinite impulse response filter. The CW weighting factor component 735 may also apply the first weighting factor to the first contention window adjustment value based on a user equipment (UE) associated with the first parameter. The CW weighting factor component 735 may also apply the first weighting factor to the first contention window adjustment value based on whether a grant associated with the first parameter is a valid grant. The CW weighting factor component 735 may also apply the first weighting factor to the first contention window adjustment value based on a number of supported UEs.

The CW weighting factor component 735 may also apply the first weighting factor to the first contention window adjustment value based on a size of a transmission opportunity or a resource allocation associated with the first parameter. The CW weighting factor component 735 may also apply the first weighting factor to the first contention window adjustment value based on a BLER target associated with the first parameter. The CW weighting factor component 735 may also apply the first weighting factor to the first contention window adjustment value based on a carrier aggregation configuration or a coordinated multipoint configuration. The CW weighting factor component 735 may also apply the first weighting factor to the first contention window adjustment value based on whether the first parameter corresponds to a broadcast channel. The CW weighting factor component 735 may also apply the first weighting factor to the first contention window adjustment value based on whether the first parameter corresponds to a UE implementing or capable of implementing interference cancellation.

Figure 8:
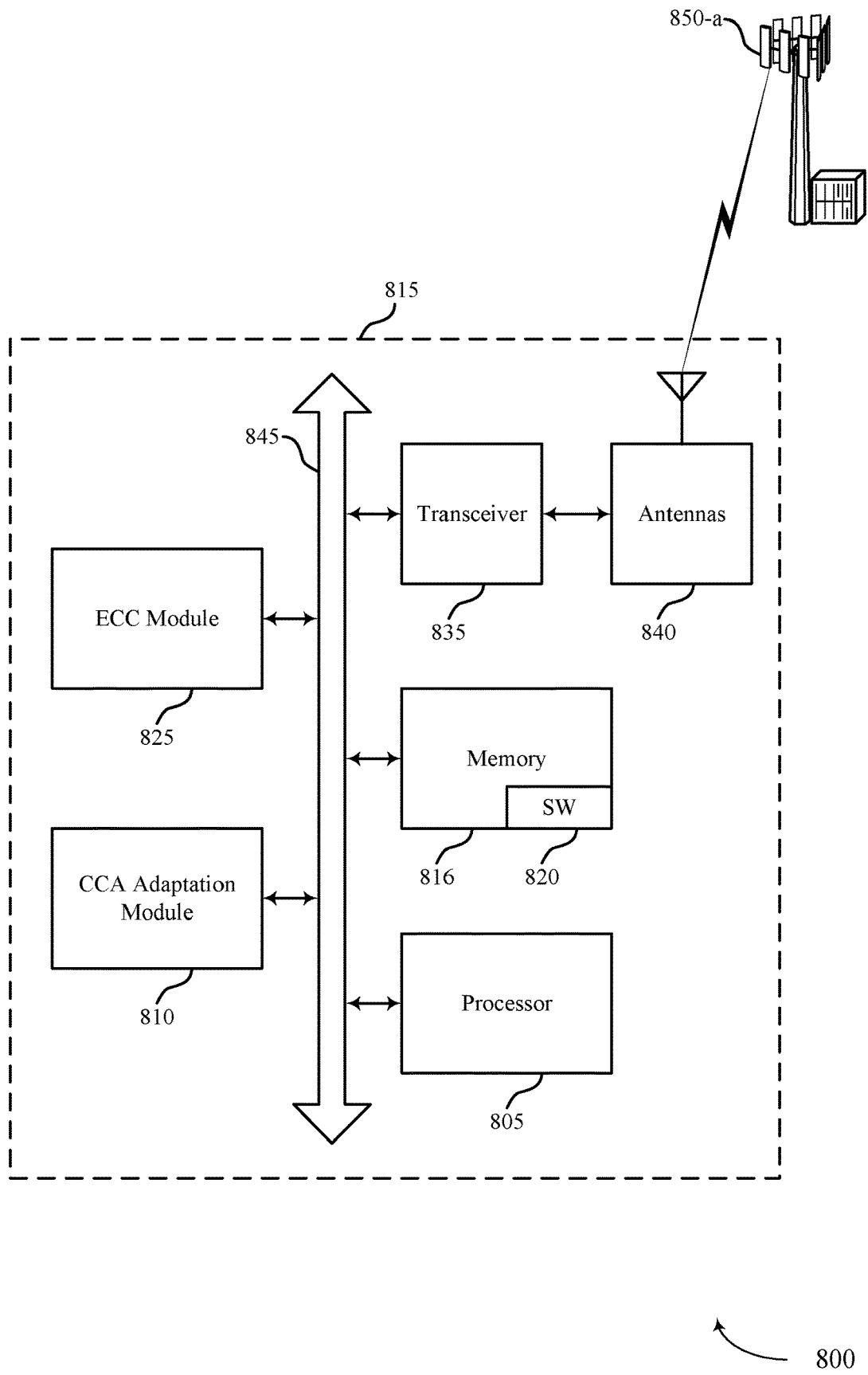
FIG. 8 illustrates a block diagram of a system including a UE that supports CCA window adaptation in accordance with aspects of the present disclosure.

FIG. 8 shows a diagram of a system 800 including a UE 115 configured for CCA window adaptation in accordance with aspects of the present disclosure. System 800 may include a UE 815, which may be an example of a wireless device 500, a wireless device 600, or a UE 115 described with reference to FIGS. 1, 2 and 5-7. UE 815 may include a CCA adaptation component 810, which may be an example of a CCA adaptation component 510 described with reference to FIGS. 5-7. UE 815 may also include a ECC Component 825. UE 815 may also include components for bi-directional voice and data communications including components for transmitting communications and components for receiving communications. For example, UE 815 may communicate bi-directionally with one or more base stations 105 such as base station 850-a.

May enable UE 815 to operate using ECCs as described with reference to FIG. 1. For example, UE 815 may operate in shared or unlicensed spectrum, using variable transmission time intervals (TTIs), or with a large number of CCs.

UE 815 may also include a processor 805, and memory 816 (including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 815 may include a single antenna 840, UE 815 may also have multiple antennas 840 capable of concurrently transmitting or receiving multiple wireless transmissions.

The memory 816 may include random access memory (RAM) and read only memory (ROM). The memory 816 may store computer-readable, computer-executable software/firmware code 820 including instructions that, when executed, cause the processor 805 to perform various functions described herein (e.g., CCA window adaptation, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.).

Figure 9:
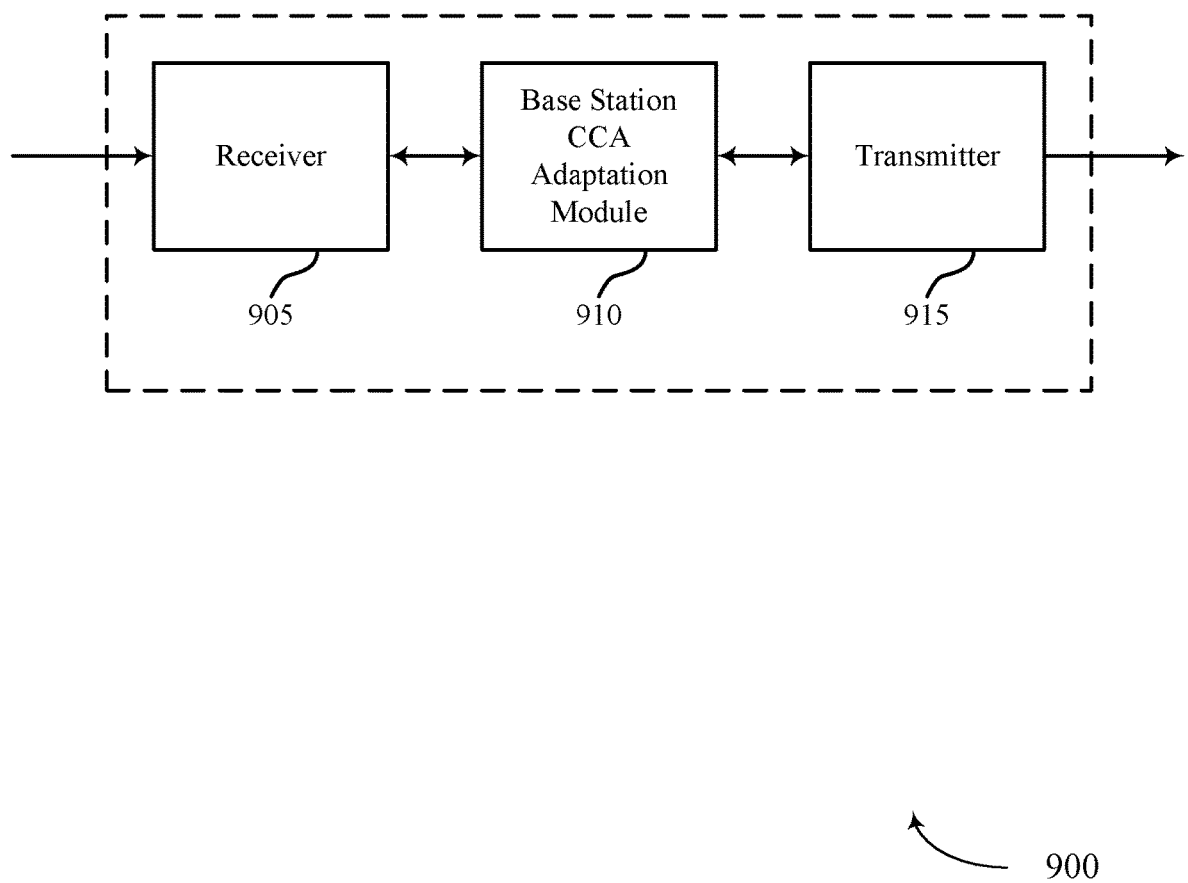
FIGS. 9 and 10 show block diagrams of a wireless device that supports CCA window adaptation in accordance with aspects of the present disclosure.

FIG. 9 shows a block diagram of a wireless device 900 that supports CCA window adaptation in accordance with aspects of the present disclosure. Wireless device 900 may be an example of aspects of a base station 105 described with reference to FIGS. 1-8. Wireless device 900 may include a receiver 905, a base station CCA adaptation component 910, or a transmitter 915. Wireless device 900 may also include a processor. Each of these components may be in communication with each other.

The receiver 905 may receive information such as packets, user data, or control information associated with various information channels (e.g., control channels, data channels, and information related to CCA window adaptation, etc.). Information may be passed on to the base station CCA adaptation component 910, and to other components of wireless device 900.

Base station CCA adaptation component 910 may determine a first parameter associated with a first transmission, determine a first contention window adjustment value based on the first parameter, apply a first weighting factor to the first contention window adjustment value, and adjust a contention window size for a second transmission based on the weighted first contention window adjustment value.

The transmitter 915 may transmit signals received from other components of wireless device 900. In some examples, the transmitter 915 may be collocated with the receiver 905 in a transceiver component. The transmitter 915 may include a single antenna, or it may include a plurality of antennas.

Figure 10:
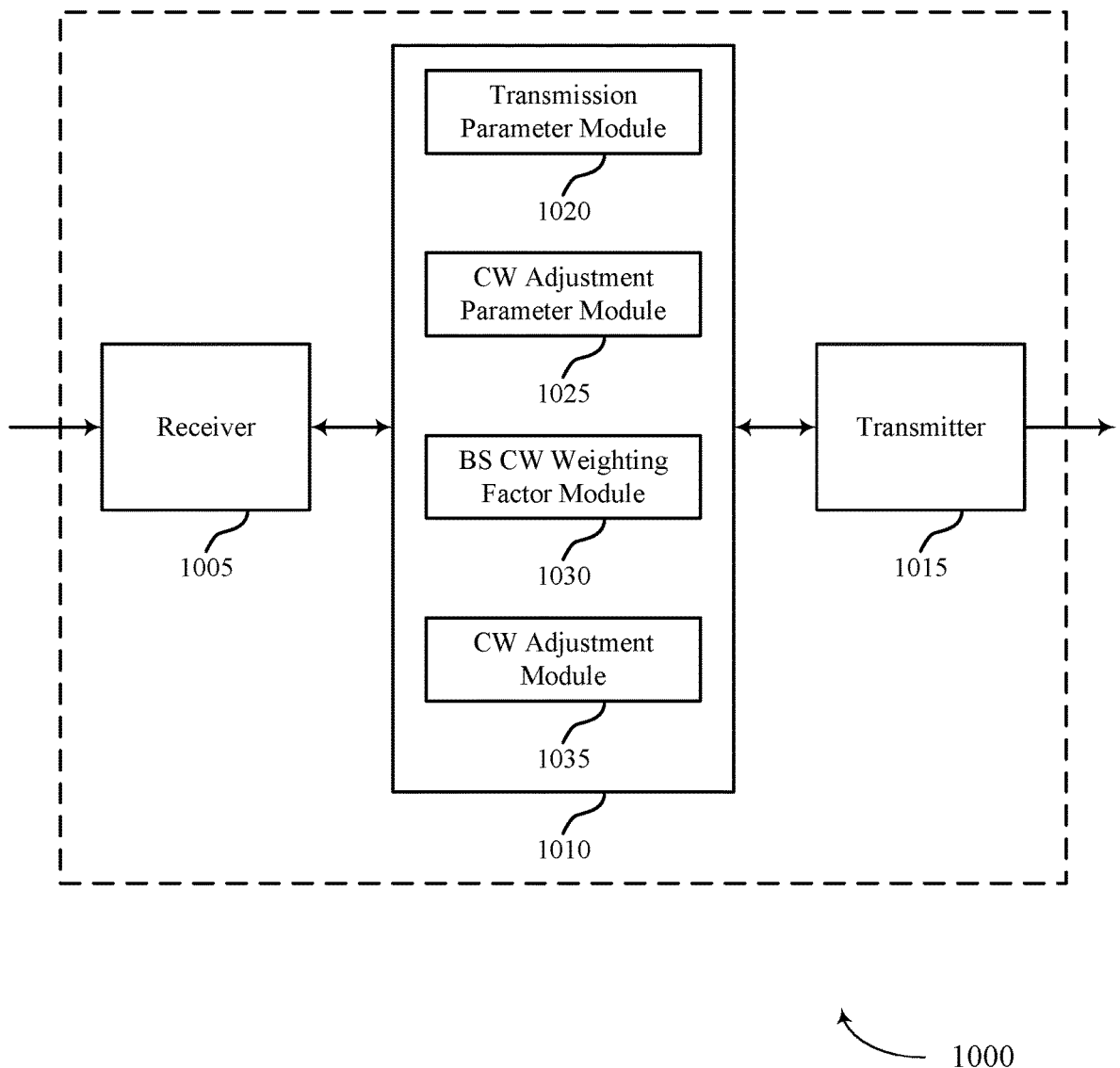

FIG. 10 shows a block diagram of a wireless device 1000 that supports CCA window adaptation in accordance with aspects of the present disclosure. Wireless device 1000 may be an example of aspects of a wireless device 900 or a base station 105 described with reference to FIGS. 1-9. Wireless device 1000 may include a receiver 1005, a base station CCA adaptation component 1010, or a transmitter 1015. Wireless device 1000 may also include a processor. Each of these components may be in communication with each other. The base station CCA adaptation component 1010 may also include a transmission parameter component 1020, a CW adjustment parameter component 1025, a BS CW weighting factor component 1030, and a CW adjustment component 1035.

The receiver 1005 may receive information which may be passed on to base station CCA adaptation component 1010, and to other components of wireless device 1000. The base station CCA adaptation component 1010 may perform the operations described with reference to FIG. 9. The transmitter 1015 may transmit signals received from other components of wireless device 1000. Transmitter 1015 may also transmit over one or more carriers, for example, a primary and secondary carriers. In some cases, the one or more secondary carriers may be within a predetermined frequency separation relative to the primary carrier, may be in an Unlicensed Information Infrastructure radio band, and/or the total number of secondary carriers may be less than a predetermined number. In some cases, transmitter 1015 may transmit after the expiration of a counter or backoff timer.

The transmission parameter component 1020 may determine a first parameter associated with a first transmission as described with reference to FIGS. 2-4. In some examples, the first parameter includes HARQ feedback for one or more transmission opportunities. In some cases, HARQ feedback is received for each carrier. In some examples, the first parameter includes at least one non-reported acknowledgement. In some examples, determining the first parameter includes determining whether a PUCCH has been successfully decoded. The transmission parameter component 1020 may also determine a second parameter associated with a second transmission. In some examples, the first parameter includes an interference indication received in a PUCCH. In some cases, the first parameter may be based on a frame structure of the first transmission. For example, the transmission parameter component 1020 may determine if the first transmission is in a licensed spectrum. In some cases, the transmission parameter component 1020 may determine that at least one ACK indication is received from each of the one or more UEs based on the first transmission. In other cases, the transmission parameter component 1020 may determine a percentage of ACKs relative to a total number of ACKs and NACKs, or it may determine the percentage of UEs that sent at least one ACK.

The CW adjustment parameter component 1025 may determine a first contention window adjustment value based on the first parameter as described with reference to FIGS. 2-4. In some examples, the first contention window adjustment value may be based on a number of NACKs in the HARQ feedback. The CW adjustment parameter component 1025 may also determine a second contention window adjustment value based on the second parameter. In some cases, the CW adjustment parameter component 1025 may determine the adjustment value using a lookup table, where the lookup table may be based on the frame structure of the first transmission. In other cases, the CW adjustment parameter component 1025 may determine the adjustment value based on the number of NACKs received for each carrier. Or, the adjustment value based on the number of NACKs received for all carriers. In other examples, the CW adjustment parameter component 1025 may determine a first contention window adjustment value based on a reported channel quality indicator (CQI) compared to a preferred CQI.

The BS CW weighting factor component 1030 may apply a first weighting factor to the first contention window adjustment value as described with reference to FIGS. 2-4.

The CW adjustment component 1035 may adjust a contention window size for a second transmission based on the weighted first contention window adjustment value as described with reference to FIGS. 2-4. In some examples, the contention widow size corresponds to an UL transmission opportunity. In some examples, the contention window size may be adjusted based on whether the UL transmission opportunity may be self-scheduled or cross-carrier scheduled. The CW adjustment component 1035 may also apply a second weighting factor to the second contention window adjustment value, such that the contention window size is adjusted based on the weighted second contention window adjustment value. In some examples, the contention widow size corresponds to a DL transmission opportunity following one or more DL transmission opportunities corresponding to the first parameter. Additionally, the CW adjustment component 1035 may adjust the contention window size for each carrier independently or may adjust all carriers similarly.

The CW adjustment component 1035 may also reset the contention window size. In some cases, resetting may be based on an elapsed duration after a previous transmission. In other cases, resetting may be based on the percentage of ACKs received or based on receiving an ACK from each user, as discussed above. In some cases, the CW adjustment component 1035 may refrain from resetting the contention window size if the second transmission is on a carrier different from the first transmission.

Figure 11:
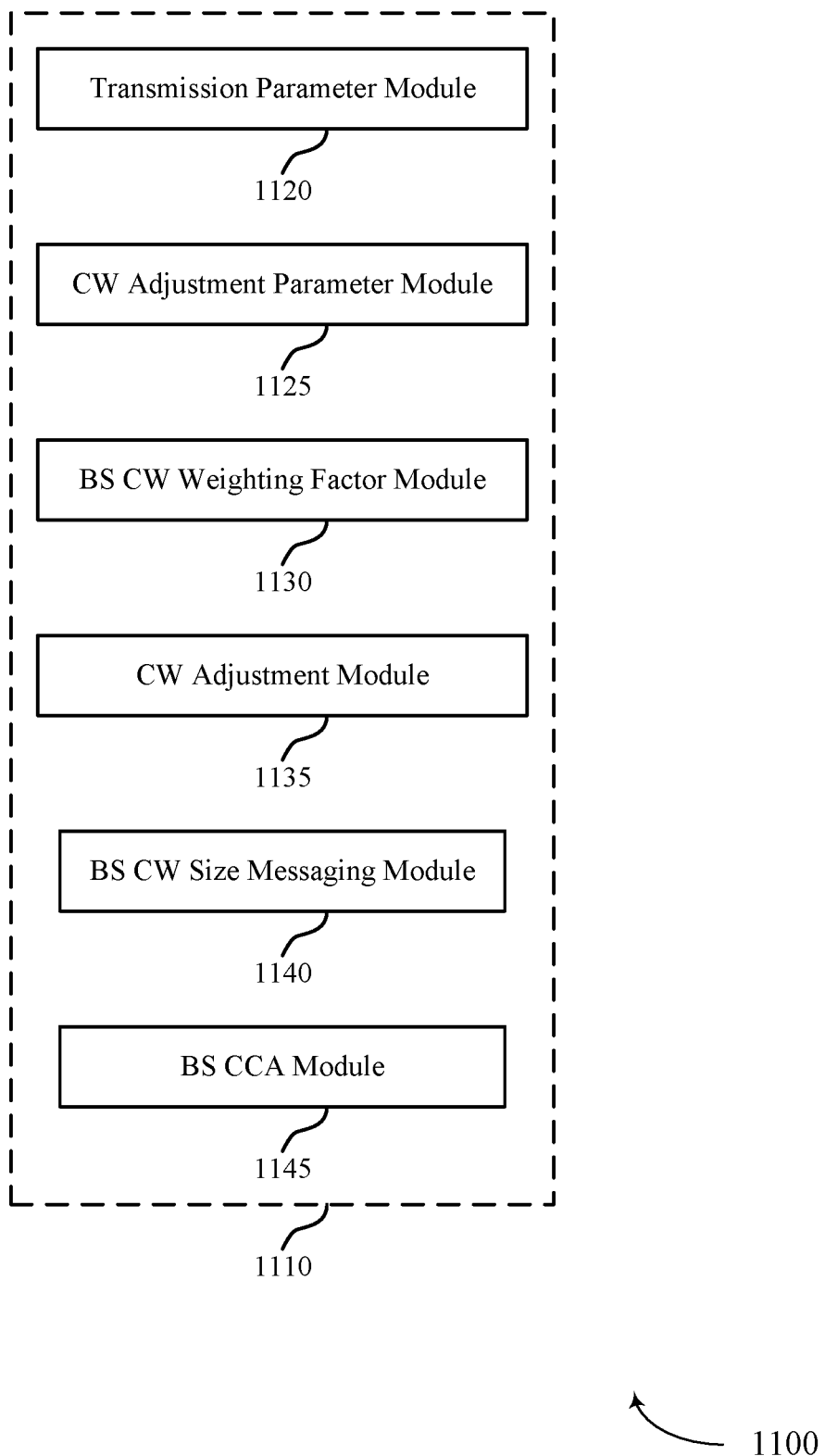
FIG. 11 shows a block diagram of a base station CCA adaptation component which may be a component of a wireless device for CCA window adaptation in accordance with various aspects of the present disclosure.

FIG. 11 shows a block diagram 1100 of a base station CCA adaptation component 910-*b* which may be a component of a wireless device 900 or a wireless device 1000 for CCA window adaptation in accordance with aspects of the present disclosure. The base station CCA adaptation component 1145 may be an example of aspects of a base station CCA adaptation component 910 described with reference to FIGS. 9-10. The base station CCA adaptation component 1145 may include a transmission parameter component 1120, a CW adjustment parameter component 1125, a BS CW weighting factor component 1130, and a CW adjustment component 1135. Each of these components may perform the functions described with reference to FIG. 10. The base station CCA adaptation component 1145 may also include a BS CW size messaging component 1140, and a BS CCA component 1145.

The BS CW size messaging component 1140 may transmit the contention window size to a UE prior to the UL transmission opportunity as described with reference to FIGS. 2-4.

The BS CCA component 1145 may perform a clear channel assessment based on the contention window size as described with reference to FIGS. 2-4.

The BS CCA component 1145 may also start a backoff timer. The backoff timer may be for a primary carrier and may apply to secondary carriers in some cases. The BS CCA component 1145 may also divide one or more UEs into one or more groups of UEs based on the contention window size for the one or more UEs, randomly generate a counter for the one or more groups, and start the counter for the one or more groups. The BS CCA component 1145 may stop the counter of the one or more groups based on the expiration of the counter for the group of UEs whose counter expired first. Subsequently, the BS CCA component 1145 may randomly regenerate the counter for the one or more groups of UEs or may retain the value of the counter for the one or more groups for a subsequent transmission.

Figure 12:
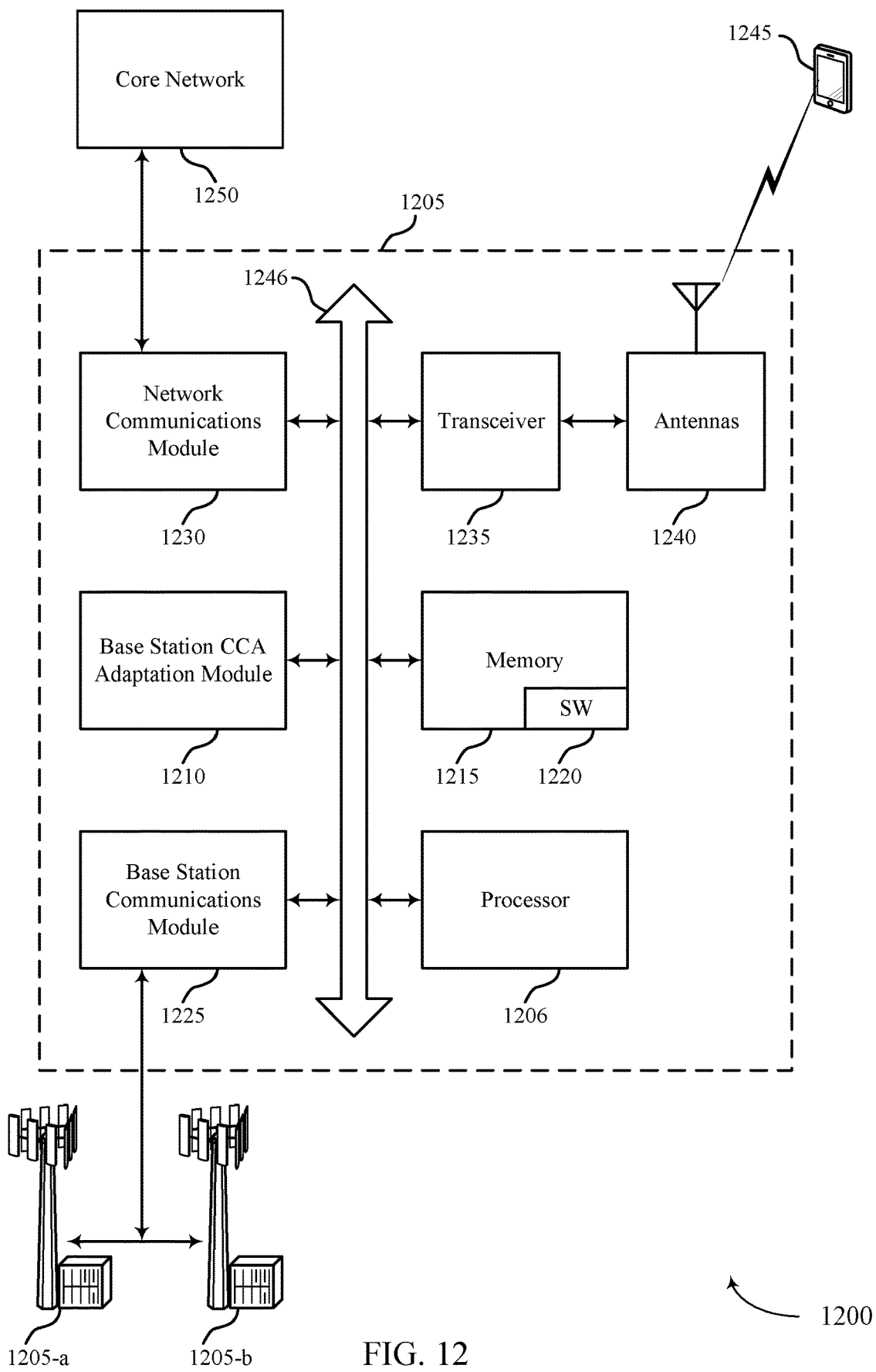
FIG. 12 illustrates a block diagram of a system including a base station that supports CCA window adaptation in accordance with aspects of the present disclosure.

FIG. 12 illustrates a block diagram of a system 1200 including a base station 105 that supports CCA window adaptation in accordance with aspects of the present disclosure. System 1200 may include base station 1205, which may be an example of a wireless device 900, a wireless device 1000, or a base station 105 described with reference to FIGS. 1, 2 and 9-11. Base station 1205 may include a base station CCA adaptation component 1210, which may be an example of a base station CCA adaptation component 910 described with reference to FIGS. 9-11. Base station 1205 may also include components for bi-directional voice and data communications including components for transmitting communications and components for receiving communications. For example, base station 1205 may communicate bi-directionally with a UE 1245 which may be an example of a UE 115 of FIG. 1.

In some cases, base station 1205 may have one or more wired backhaul links. Base station 1205 may have a wired backhaul link (e.g., S1 interface, etc.) to the core network 130. Base station 1205 may also communicate with other base stations 105 such as base station 1205-*a* or base station 1205-*b* via inter-base station backhaul links (e.g., an X2 interface). Each of the base stations 1205 may communicate with UEs 115 using the same or different wireless communications technologies. In some cases, base station 1205 may communicate with other base stations utilizing base station communication component 1225. In some examples, base station communication component 1225 may provide an X2 interface within a Long Term Evolution (LTE)/LTE wireless communication network technology to provide communication between some of the base stations 105. In some examples, base station 1205 may communicate with other base stations through core network 130. In some cases, base station 1205 may communicate with the core network 130 through network communication component 1230.

The base station 1205 may include a processor 1206, memory 1215 (including software (SW) 1220), transceiver 1235, and antenna(s) 1240, which each may be in communication, directly or indirectly, with one another (e.g., over bus system 1246). The transceivers 1235 may be configured to communicate bi-directionally, via the antenna(s) 1240, with the UEs 115, which may be multi-mode devices. The transceiver 1235 (or other components of the base station 1205) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 1205 may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1206 to perform various functions described herein (e.g., CCA window adaptation, selecting coverage enhancement techniques, call processing, database management, message routing, etc.). Alternatively, the software 1220 may not be directly executable by the processor 1206 but be configured to cause the computer, e.g., when compiled and executed, to perform functions described herein. The processor 1206 may include an intelligent hardware device, e.g., a CPU, a microcontroller, an ASIC, etc. The processor 1206 may include various special purpose processors such as encoders, queue processing components, base band processors, radio head controllers, digital signal processor (DSPs), and the like.

The base station communication component 1225 may manage communications with other base stations 105. In some cases, a communications management component may include a controller or scheduler for controlling communications with UEs 115 in cooperation with other base stations 105. For example, the base station communication component 1225 may coordinate scheduling for transmissions to UEs 115 for various interference mitigation techniques such as beamforming or joint transmission.

The components of wireless device 500, wireless device 600, and CCA adaptation component 510, UE 815, wireless device 900, wireless device 1000, BS CCA adaptation component 910, and base station 1205 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
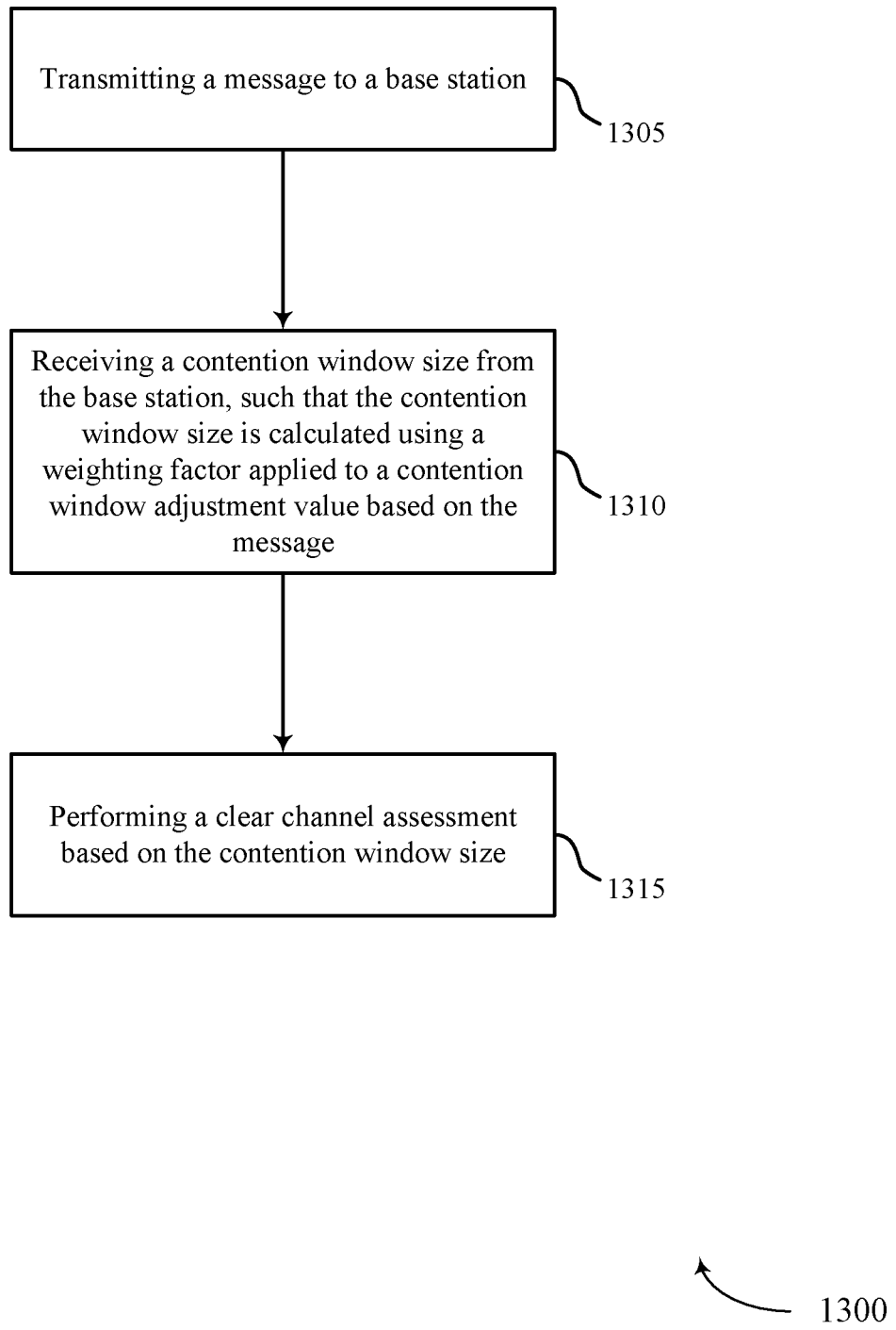
FIGS. 13 through 21 show flowcharts illustrating methods for CCA window adaptation in accordance with aspects of the present disclosure.

FIG. 13 shows a flowchart illustrating a method 1300 for CCA window adaptation in accordance with aspects of the present disclosure. The operations of method 1300 may be implemented by a UE 115 or its components as described with reference to FIGS. 1-12. For example, the operations of method 1300 may be performed by the CCA adaptation component 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware.

At block 1305, the UE 115 may transmit a message to a base station as described with reference to FIGS. 2-4. In some examples, transmitting the message to the base station includes transmitting a bit indicating that at least one transport block in a downlink transmission was successfully decoded or transmitting a bit indicating that at least one code block in a downlink transmission was successfully decoded or transmitting a bit indicating a collision during a downlink transmission. In some examples, the operations of block 1305 may be performed by the message transmission component 620 as described with reference to FIG. 6.

At block 1310, the UE 115 may receive a contention window size from the base station, such that the contention window size is calculated using a first weighting factor applied to a first contention window adjustment value based on the message as described with reference to FIGS. 2-4. In some examples, the operations of block 1310 may be performed by the CW size messaging component 625 as described with reference to FIG. 6.

At block 1315, the UE 115 may perform a clear channel assessment based on the contention window size as described with reference to FIGS. 2-4. In some examples, the operations of block 1315 may be performed by the CCA component 630 as described with reference to FIG. 6.

Figure 14:
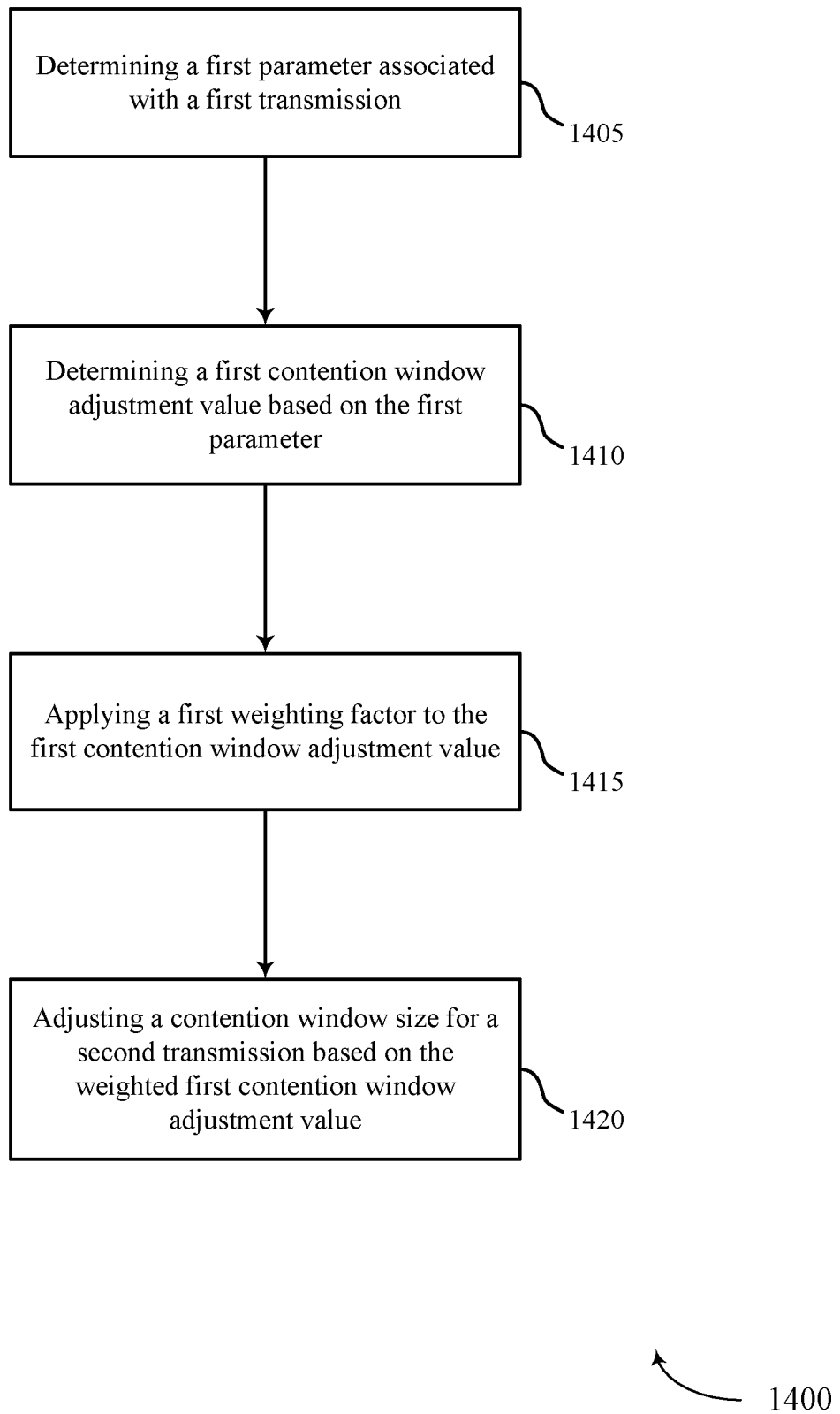

FIG. 14 shows a flowchart illustrating a method 1400 for CCA window adaptation in accordance with aspects of the present disclosure. The operations of method 1400 may be implemented by a base station 105 or its components as described with reference to FIGS. 1-12. For example, the operations of method 1400 may be performed by the base station CCA adaptation component 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 1400 may also incorporate aspects of method 1300 of FIG. 13.

At block 1405, the base station 105 may determine a first parameter associated with a first transmission as described with reference to FIGS. 2-4. In some examples, the operations of block 1405 may be performed by the transmission parameter component 1020 as described with reference to FIG. 10.

At block 1410, the base station 105 may determine a first contention window adjustment value based on the first parameter as described with reference to FIGS. 2-4. In some examples, the operations of block 1410 may be performed by the CW adjustment parameter component 1025 as described with reference to FIG. 10.

At block 1415, the base station 105 may apply a first weighting factor to the first contention window adjustment value as described with reference to FIGS. 2-4. In some examples, the operations of block 1415 may be performed by the BS CW weighting factor component 1030 as described with reference to FIG. 10.

At block 1420, the base station 105 may adjust a contention window size for a second transmission based on the weighted first contention window adjustment value as described with reference to FIGS. 2-4. In some examples, the operations of block 1420 may be performed by the CW adjustment component 1035 as described with reference to FIG. 10.

Figure 15:
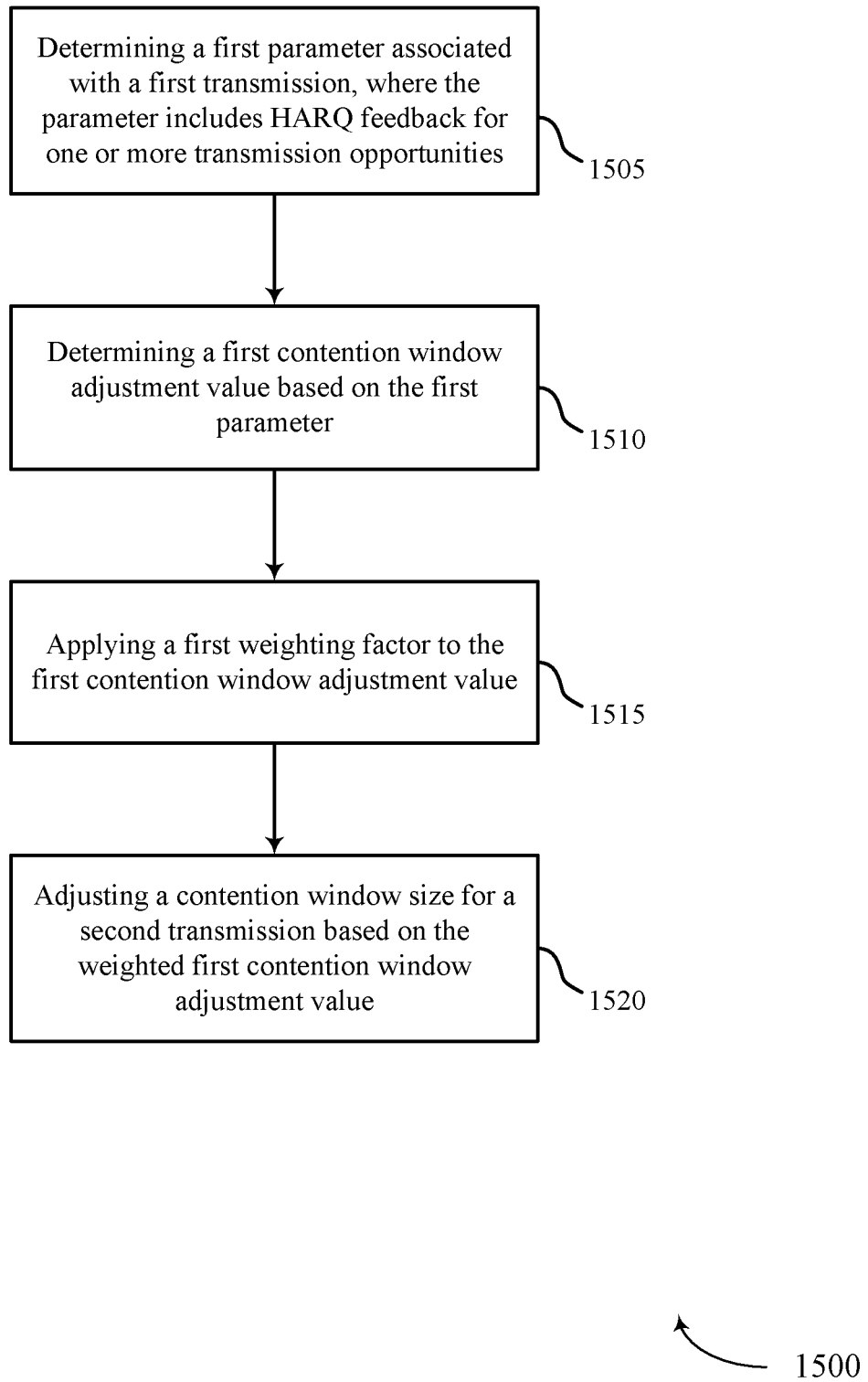

FIG. 15 shows a flowchart illustrating a method 1500 for CCA window adaptation in accordance with aspects of the present disclosure. The operations of method 1500 may be implemented by a base station 105 or its components as described with reference to FIGS. 1-12. For example, the operations of method 1500 may be performed by the base station CCA adaptation component 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 1500 may also incorporate aspects of methods 1300, and 1400 of FIGS. 13-14.

At block 1505, the base station 105 may determine a first parameter associated with a first transmission as described with reference to FIGS. 2-4. In some examples, the operations of block 1505 may be performed by the transmission parameter component 1020 as described with reference to FIG. 10.

At block 1510, the base station 105 may determine a first contention window adjustment value based on the first parameter as described with reference to FIGS. 2-4. In some cases, the first parameter includes HARQ feedback for one or more transmission opportunities. In some examples, the operations of block 1510 may be performed by the CW adjustment parameter component 1025 as described with reference to FIG. 10.

At block 1515, the base station 105 may apply a first weighting factor to the first contention window adjustment value as described with reference to FIGS. 2-4. In some examples, the operations of block 1515 may be performed by the BS CW weighting factor component 1030 as described with reference to FIG. 10.

At block 1520, the base station 105 may adjust a contention window size for a second transmission based on the weighted first contention window adjustment value as described with reference to FIGS. 2-4. In some examples, the operations of block 1520 may be performed by the CW adjustment component 1035 as described with reference to FIG. 10.

Figure 16:
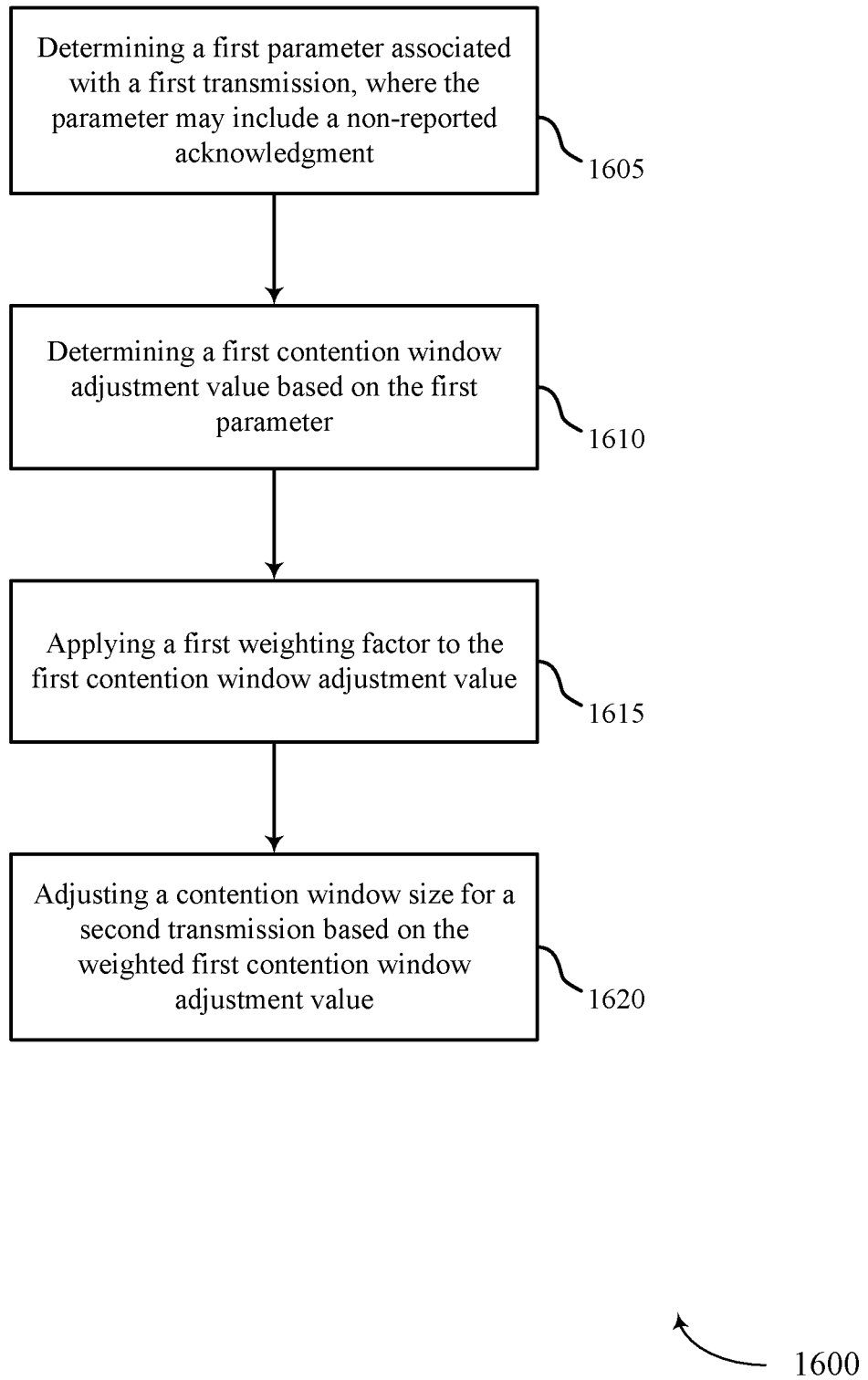

FIG. 16 shows a flowchart illustrating a method 1600 for CCA window adaptation in accordance with aspects of the present disclosure. The operations of method 1600 may be implemented by a base station 105 or its components as described with reference to FIGS. 1-12. For example, the operations of method 1600 may be performed by the base station CCA adaptation component 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 1600 may also incorporate aspects of methods 1300, 1400, and 1500 of FIGS. 13-15.

At block 1605, the base station 105 may determine a first parameter associated with a first transmission as described with reference to FIGS. 2-4. In some cases, the first parameter includes at least one non-reported acknowledgement. In some examples, the operations of block 1605 may be performed by the transmission parameter component 1020 as described with reference to FIG. 10.

At block 1610, the base station 105 may determine a first contention window adjustment value based on the first parameter as described with reference to FIGS. 2-4. In some examples, the operations of block 1610 may be performed by the CW adjustment parameter component 1025 as described with reference to FIG. 10.

At block 1615, the base station 105 may apply a first weighting factor to the first contention window adjustment value as described with reference to FIGS. 2-4. In some examples, the operations of block 1615 may be performed by the BS CW weighting factor component 1030 as described with reference to FIG. 10.

At block 1620, the base station 105 may adjust a contention window size for a second transmission based on the weighted first contention window adjustment value as described with reference to FIGS. 2-4. In some examples, the operations of block 1620 may be performed by the CW adjustment component 1035 as described with reference to FIG. 10.

Figure 17:
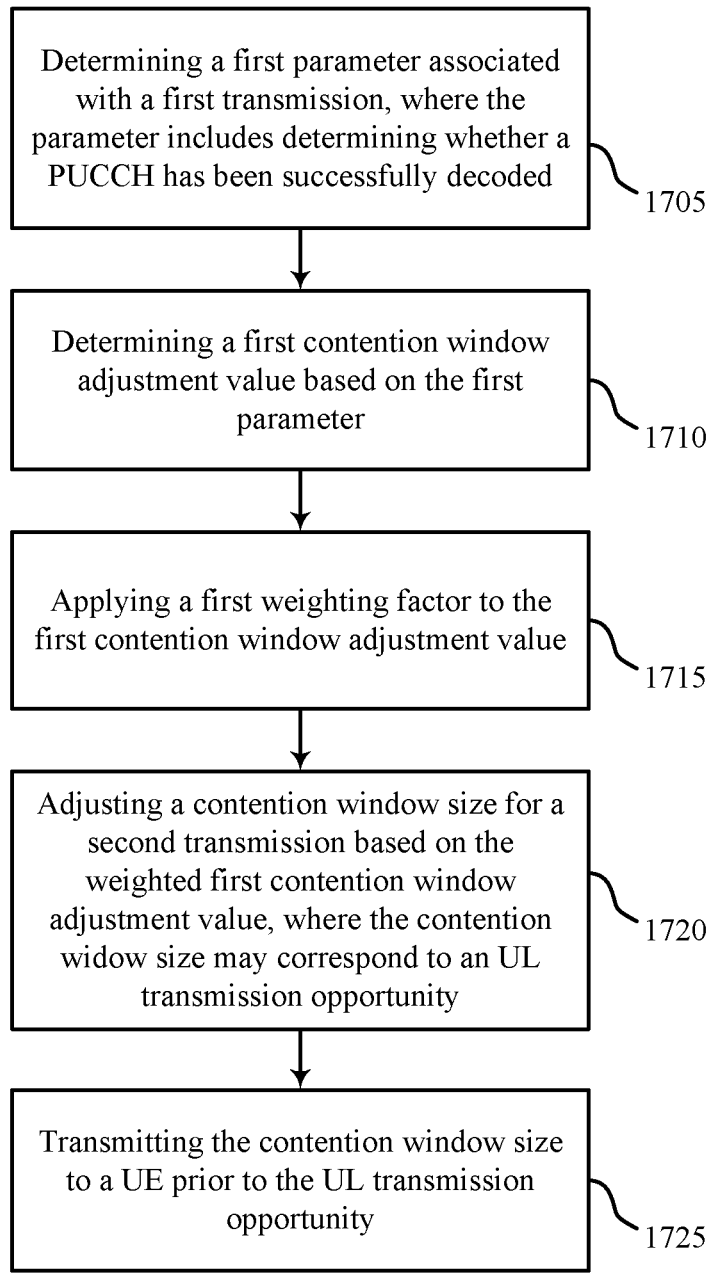

FIG. 17 shows a flowchart illustrating a method 1700 for CCA window adaptation in accordance with aspects of the present disclosure. The operations of method 1700 may be implemented by a base station 105 or its components as described with reference to FIGS. 1-12. For example, the operations of method 1700 may be performed by the base station CCA adaptation component 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 1700 may also incorporate aspects of methods 1300, 1400, 1500, and 1600 of FIGS. 13-16.

At block 1705, the base station 105 may determine a first parameter associated with a first transmission as described with reference to FIGS. 2-4. In some cases, determining the first parameter includes: determining whether a PUCCH has been successfully decoded. In some examples, the operations of block 1705 may be performed by the transmission parameter component 1020 as described with reference to FIG. 10.

At block 1710, the base station 105 may determine a first contention window adjustment value based on the first parameter as described with reference to FIGS. 2-4. In some examples, the operations of block 1710 may be performed by the CW adjustment parameter component 1025 as described with reference to FIG. 10.

At block 1715, the base station 105 may apply a first weighting factor to the first contention window adjustment value as described with reference to FIGS. 2-4. In some examples, the operations of block 1715 may be performed by the BS CW weighting factor component 1030 as described with reference to FIG. 10.

At block 1720, the base station 105 may adjust a contention window size for a second transmission based on the weighted first contention window adjustment value as described with reference to FIGS. 2-4. In some cases, the contention widow size corresponds to an UL transmission opportunity. In some examples, the operations of block 1720 may be performed by the CW adjustment component 1035 as described with reference to FIG. 10.

At block 1725, the base station 105 may transmit the contention window size to a UE prior to the UL transmission opportunity as described with reference to FIGS. 2-4. In some examples, the operations of block 1725 may be performed by the BS CW size messaging component 1140 as described with reference to FIG. 11.

Figure 18:
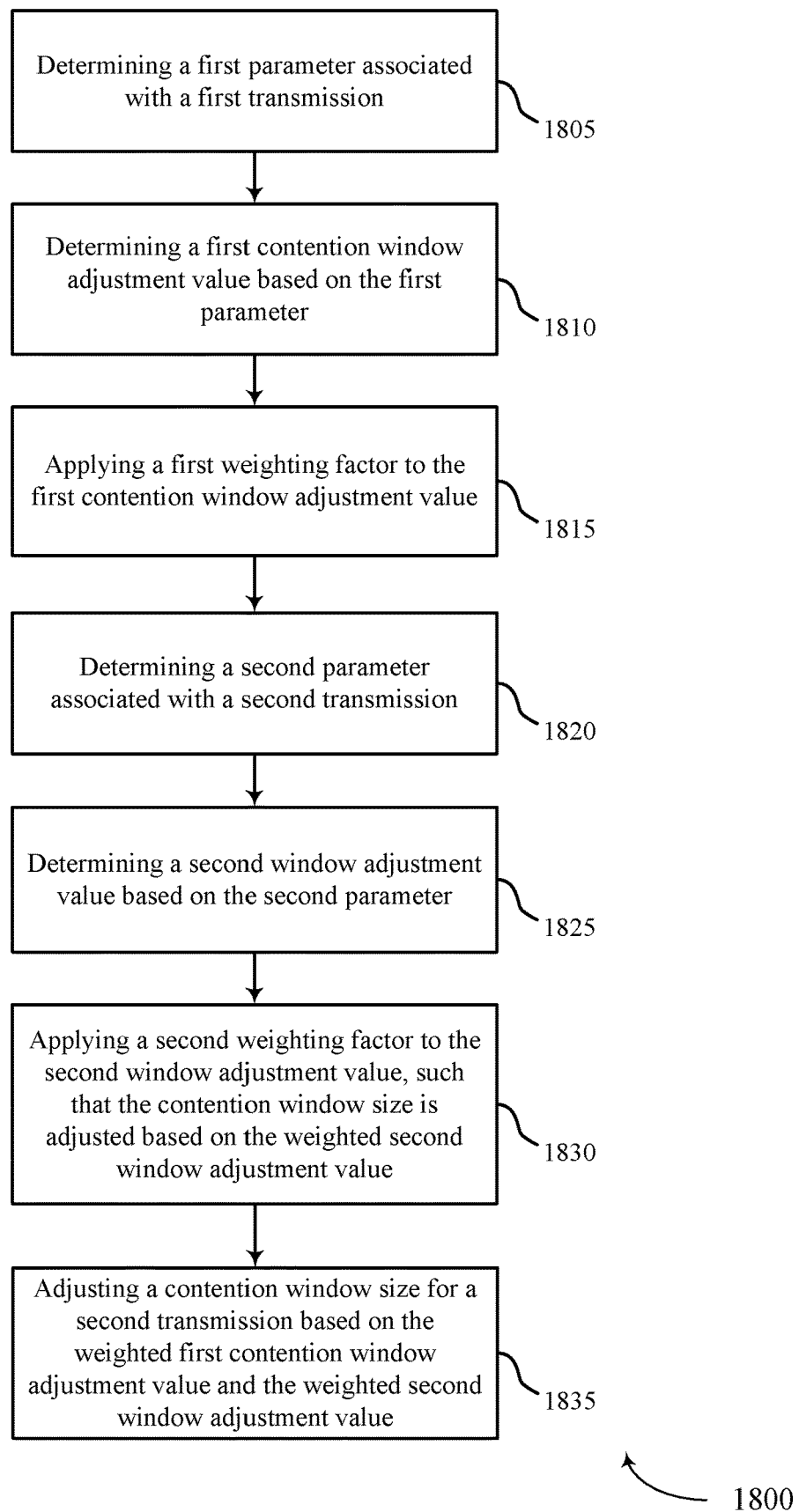

FIG. 18 shows a flowchart illustrating a method 1800 for CCA window adaptation in accordance with aspects of the present disclosure. The operations of method 1800 may be implemented by a base station 105 or its components as described with reference to FIGS. 1-12. For example, the operations of method 1800 may be performed by the base station CCA adaptation component 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 1800 may also incorporate aspects of methods 1300, 1400, 1500, 1600, and 1700 of FIGS. 13-17.

At block 1805, the base station 105 may determine a first parameter associated with a first transmission as described with reference to FIGS. 2-4. In some examples, the operations of block 1805 may be performed by the transmission parameter component 1020 as described with reference to FIG. 10.

At block 1810, the base station 105 may determine a first contention window adjustment value based on the first parameter as described with reference to FIGS. 2-4. In some examples, the operations of block 1810 may be performed by the CW adjustment parameter component 1025 as described with reference to FIG. 10.

At block 1815, the base station 105 may apply a first weighting factor to the first contention window adjustment value as described with reference to FIGS. 2-4. In some examples, the operations of block 1815 may be performed by the BS CW weighting factor component 1030 as described with reference to FIG. 10.

At block 1820, the base station 105 may determine a second parameter associated with a second transmission as described with reference to FIGS. 2-4. In some examples, the operations of block 1820 may be performed by the transmission parameter component 1020 as described with reference to FIG. 10.

At block 1825, the base station 105 may determine a second contention window adjustment value based on the second parameter as described with reference to FIGS. 2-4. In some examples, the operations of block 1825 may be performed by the CW adjustment parameter component 1025 as described with reference to FIG. 10.

At block 1830, the base station 105 may apply a second weighting factor to the second window adjustment value, such that the contention window size is adjusted based on the weighted second contention window adjustment value as described with reference to FIGS. 2-4. In some examples, the operations of block 1830 may be performed by the CW adjustment component 1035 as described with reference to FIG. 10.

At block 1835, the base station 105 may adjust a contention window size for a second transmission based on the weighted first contention window adjustment value as described with reference to FIGS. 2-4. In some examples, the operations of block 1835 may be performed by the CW adjustment component 1035 as described with reference to FIG. 10.

Figure 19:
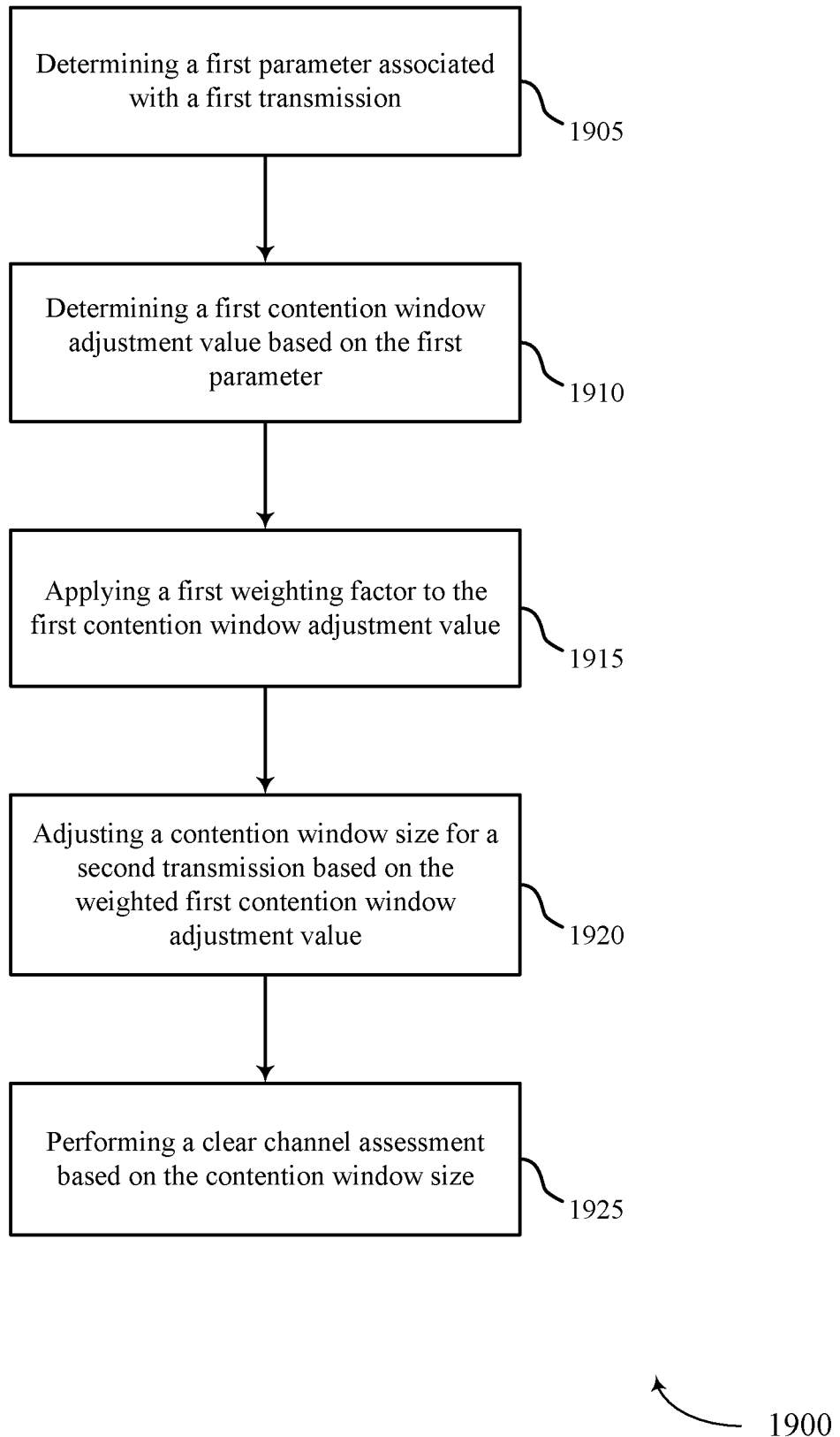

FIG. 19 shows a flowchart illustrating a method 1900 for CCA window adaptation in accordance with aspects of the present disclosure. The operations of method 1900 may be implemented by a base station 105 or its components as described with reference to FIGS. 1-12. For example, the operations of method 1900 may be performed by the base station CCA adaptation component 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 1900 may also incorporate aspects of methods 1300, 1400, 1500, 1600, 1700, and 1800 of FIGS. 13-18.

At block 1905, the base station 105 may determine a first parameter associated with a first transmission as described with reference to FIGS. 2-4. In some examples, the operations of block 1905 may be performed by the transmission parameter component 1020 as described with reference to FIG. 10.

At block 1910, the base station 105 may determine a first contention window adjustment value based on the first parameter as described with reference to FIGS. 2-4. In some examples, the operations of block 1910 may be performed by the CW adjustment parameter component 1025 as described with reference to FIG. 10.

At block 1915, the base station 105 may apply a first weighting factor to the first contention window adjustment value as described with reference to FIGS. 2-4. In some examples, the operations of block 1915 may be performed by the BS CW weighting factor component 1030 as described with reference to FIG. 10.

At block 1920, the base station 105 may adjust a contention window size for a second transmission based on the weighted first contention window adjustment value as described with reference to FIGS. 2-4. In some examples, the operations of block 1920 may be performed by the CW adjustment component 1035 as described with reference to FIG. 10.

At block 1925, the base station 105 may perform a clear channel assessment based on the contention window size as described with reference to FIGS. 2-4. In some examples, the operations of block 1925 may be performed by the CCA component 630 as described with reference to FIG. 6.

Figure 20:
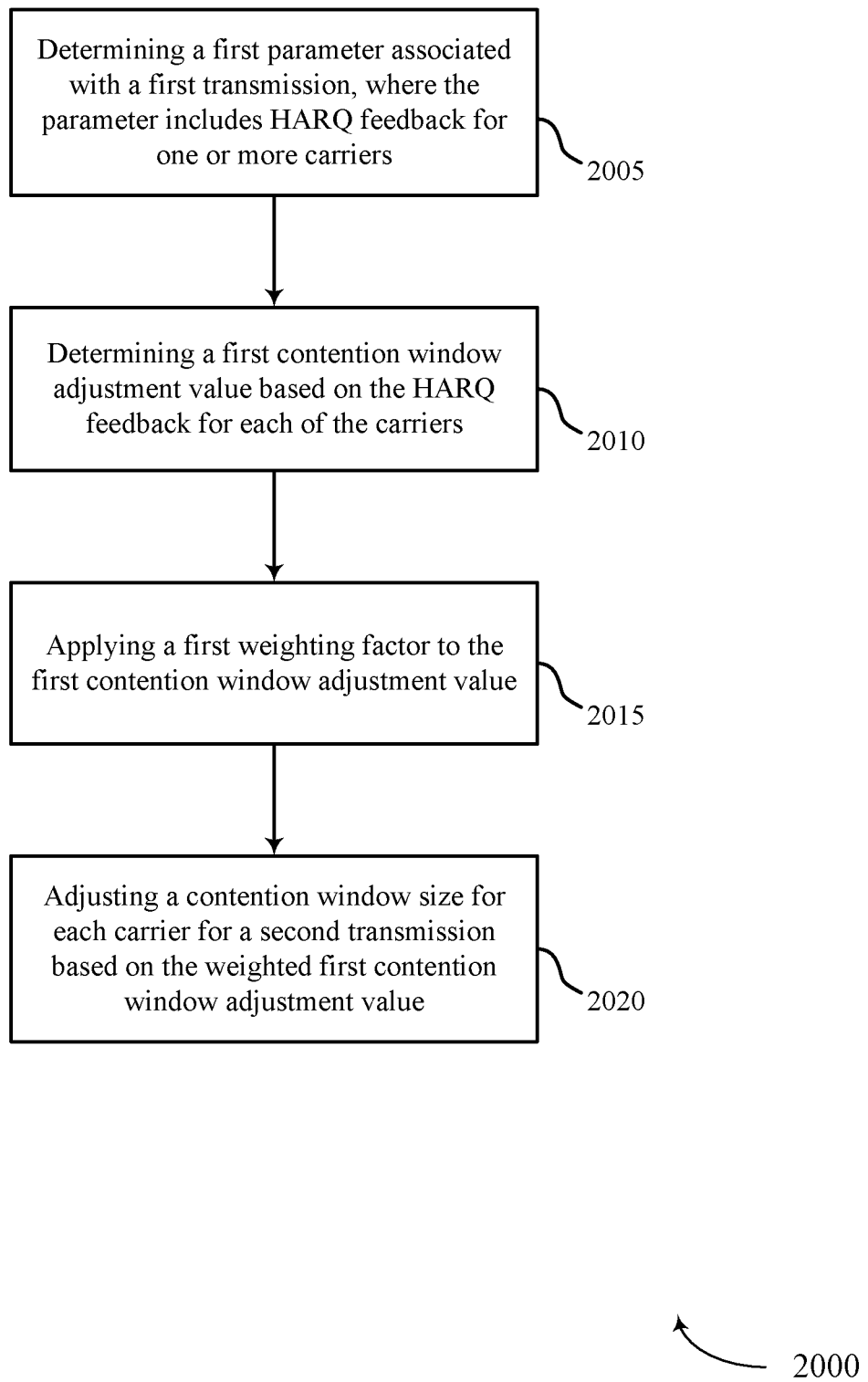

FIG. 20 shows a flowchart illustrating a method 2000 for CCA window adaptation in accordance with aspects of the present disclosure. The operations of method 2000 may be implemented by a base station 105 or its components as described with reference to FIGS. 1-12. For example, the operations of method 2000 may be performed by the base station CCA adaptation component 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 2000 may also incorporate aspects of methods 1300, 1400, 1500, 1600, 1700, 1800, and 1900 of FIGS. 13-19.

At block 2005, the base station 105 may determine a first parameter associated with a first transmission, where the parameter includes HARQ feedback for one or more carriers as described with reference to FIGS. 2-4. In some examples, the operations of block 2005 may be performed by the transmission parameter component 1020 as described with reference to FIG. 10.

At block 2010, the base station 105 may determine a first contention window adjustment value based on the HARQ feedback for each of the carriers as described with reference to FIGS. 2-4. In some examples, the operations of block 2010 may be performed by the CW adjustment parameter component 1025 as described with reference to FIG. 10.

At block 2015, the base station 105 may apply a first weighting factor to the first contention window adjustment value as described with reference to FIGS. 2-4. In some examples, the operations of block 2015 may be performed by the BS CW weighting factor component 1030 as described with reference to FIG. 10.

At block 2020, the base station 105 may adjust a contention window size for each carrier for a second transmission based on the weighted first contention window adjustment value as described with reference to FIGS. 2-4. In some examples, the operations of block 2020 may be performed by the CW adjustment component 1035 as described with reference to FIG. 10.

Figure 21:
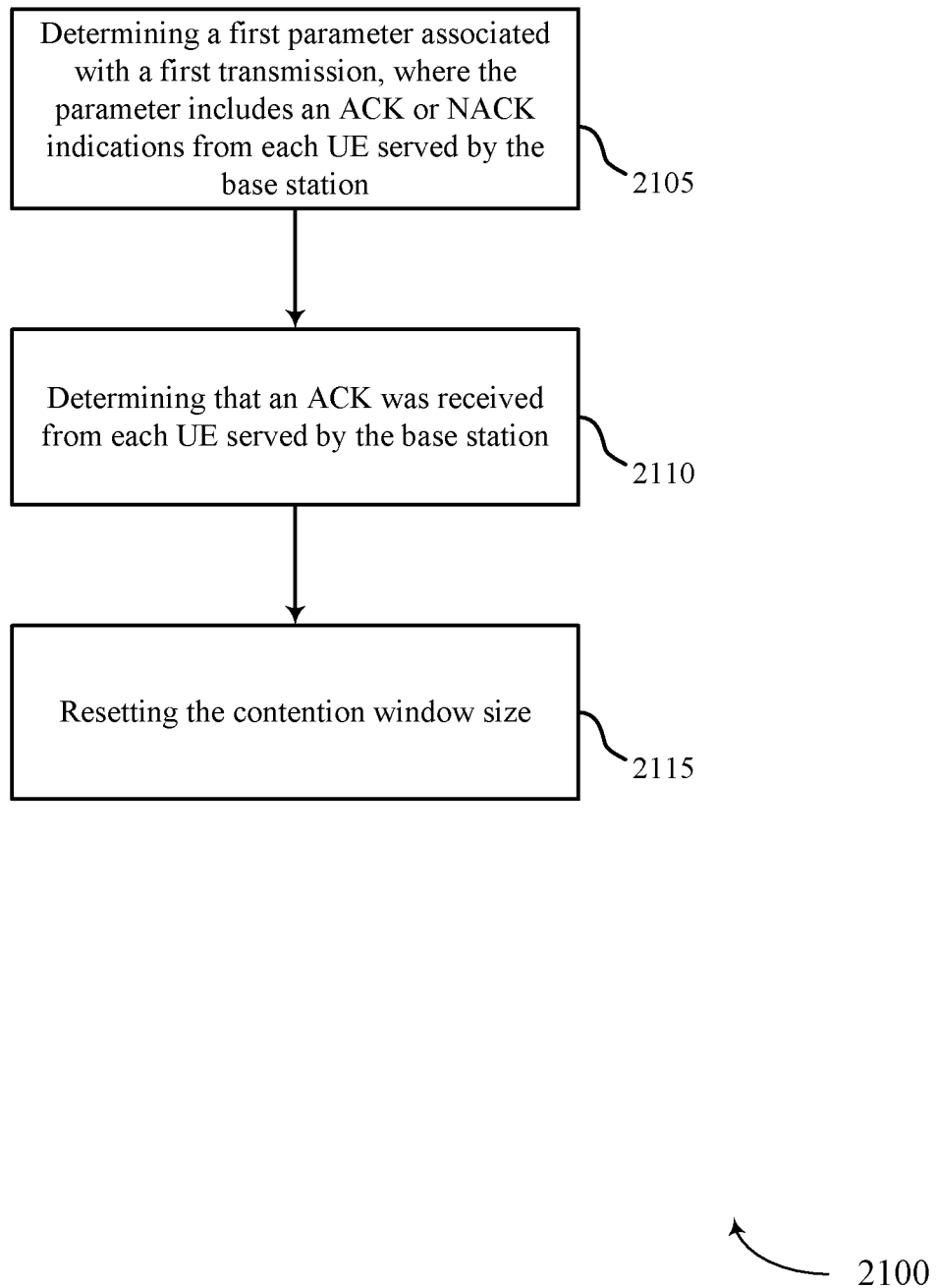

FIG. 21 shows a flowchart illustrating a method 2100 for CCA window adaptation in accordance with aspects of the present disclosure. The operations of method 2100 may be implemented by a base station 105 or its components as described with reference to FIGS. 1-12. For example, the operations of method 2100 may be performed by the base station CCA adaptation component 910 as described with reference to FIGS. 9-12. In some examples, a base station 105 may execute a set of codes to control the functional elements of the base station 105 to perform the functions described below. Additionally or alternatively, the base station 105 may perform aspects of the functions described below using special-purpose hardware. The method 2100 may also incorporate aspects of methods 1300, 1400, 1500, 1600, 1700, 1800, 1900, and 2000 of FIGS. 13-20.

At block 2105, the base station 105 may determine a first parameter associated with a first transmission, where the parameter includes an ACK or NACK indications from each UE served by the base station as described with reference to FIGS. 2-4. In some examples, the operations of block 2105 may be performed by the transmission parameter component 1020 as described with reference to FIG. 10.

At block 2110, the base station 105 may determine that an ACK was received from each UE served by the base station as described with reference to FIGS. 2-4. In some examples, the operations of block 2110 may be performed by the CW adjustment parameter component 1025 as described with reference to FIG. 10.

At block 2115, the base station 105 may reset the contention window size as described with reference to FIGS. 2-4. In some examples, the operations of block 2115 may be performed by the CW adjustment component 1035 as described with reference to FIG. 10.

Thus, methods 1300, 1400, 1500, 1600, 1700, 1800, 1900, 2000, and 2100 may provide for CCA window adaptation. It should be noted that methods 1300, 1400, 1500, 1600, 1700, 1800, and 1900 describe possible implementation, and that the operations and the steps may be rearranged or otherwise modified such that other implementations are possible. In some examples, aspects from two or more of the methods 1300, 1400, 1500, 1600, 1700, 1800, and 1900 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE advanced (LTE) are new releases of Universal Mobile Telecommunications System (UMTS) that use E-UTRA. UTRA, E-UTRA, Universal Mobile Telecommunications System (UMTS), LTE, LTE, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE networks, including such networks described herein, the term evolved node B (eNB) may be used to describe the base stations, for example. The wireless communications system or systems described herein may include a heterogeneous LTE/LTE network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communications comprising:
   determining a feedback parameter associated with a first transmission;
   determining a contention window adjustment value based at least in part on the feedback parameter, wherein determining the contention window adjustment value comprises weighting a non-reported acknowledgement as a reported negative acknowledgment (NACK); and
   adjusting a contention window size for a second transmission based at least in part on the contention window adjustment value.

2. The method of claim 1, wherein determining the contention window adjustment value comprises weighting a HARQ feedback based at least in part on whether the HARQ feedback is in a multiplexed mode.

3. The method of claim 1, wherein determining the contention window adjustment value comprises weighting an identified discontinuous transmission (DTX) as a reported negative acknowledgment (NACK).

4. The method of claim 1, wherein:
   determining the contention window adjustment value is based at least in part on feedback parameters for a plurality of carriers; and
   adjusting the contention window size comprises adjusting the contention window size for all of the plurality of carriers.

5. The method of claim 1, wherein the feedback parameter comprises hybrid automatic repeat request (HARQ) feedback for one or more transmission opportunities.

6. The method of claim 5, wherein determining the contention window adjustment value is based at least in part on a number of negative acknowledgement (NACKs) in the HARQ feedback.

7. The method of claim 1, wherein determining the feedback parameter comprises:
   determining whether a physical uplink control channel (PUCCH) has been successfully decoded.

8. The method of claim 1, wherein the contention window size corresponds to a transmission opportunity, and the contention window size is adjusted based at least in part on whether the transmission opportunity is self-scheduled or cross-carrier scheduled.

9. The method of claim 1, further comprising:
   transmitting the first transmission over one or more carriers.

10. The method of claim 9, wherein the first transmission is transmitted over a plurality of carriers, the method further comprising:
    determining a different contention window size for each of the plurality of carriers.

11. The method of claim 9, wherein the first transmission is transmitted over a plurality of carriers, the method further comprising:
    receiving a number of negative acknowledgements (NACKs) through hybrid automatic repeat request (HARQ) feedback for each of the plurality of carriers; and
    adjusting the contention window size for the second transmission for all of the plurality of carriers based at least in part on the number of NACKs for all of the plurality of carriers, wherein the contention window size is the same for all of the plurality of carriers.

12. The method of claim 9, wherein the one or more carriers comprise a primary carrier and one or more secondary carriers, the method further comprising:
    starting a backoff timer associated with the primary carrier, wherein the backoff timer applies to the one or more secondary carriers.

13. The method of claim 1, further comprising:
    performing a clear channel assessment based at least in part on the contention window size.

14. The method of claim 1, further comprising:
    transmitting the second transmission on a carrier that is different from a carrier of the first transmission; and
    refraining from resetting the contention window size.

15. The method of claim 1, wherein the first transmission is sent to one or more UEs, the method further comprising:
    resetting the contention window size.

16. The method of claim 1, wherein the feedback parameter comprises an interference indication received in a PUCCH.

17. The method of claim 1, wherein the contention widow size corresponds to a DL transmission opportunity following one or more DL transmission opportunities corresponding to the feedback parameter.

18. An apparatus for wireless communications, comprising:
    a processor;
    memory coupled to the processor; and
    the processor and memory configured to:
        determine a feedback parameter associated with a first transmission;
        determine a contention window adjustment value based at least in part on the feedback parameter, wherein determining the contention window adjustment value comprises weighting a non-reported acknowledgement as a reported negative acknowledgment (NACK); and
        adjust a contention window size for a second transmission based at least in part on the contention window adjustment value.

19. The apparatus of claim 18, wherein determining the contention window adjustment value comprises weighting a HARQ feedback based at least in part on whether the HARQ feedback is in a multiplexed mode.

20. The apparatus of claim 18, wherein determining the contention window adjustment value comprises weighting an identified discontinuous transmission (DTX) as a reported negative acknowledgment (NACK).

21. The apparatus of claim 18, wherein:
    determining the contention window adjustment value is based at least in part on feedback parameters for a plurality of carriers; and
    adjusting the contention window size comprises adjusting the contention window size for all of the plurality of carriers.

22. The apparatus of claim 18, wherein the feedback parameter comprises hybrid automatic repeat request (HARQ) feedback for one or more transmission opportunities.

23. The apparatus of claim 22, wherein determining the contention window adjustment value is based at least in part on a number of negative acknowledgement (NACKs) in the HARQ feedback.

24. The apparatus of claim 18, wherein, to determine the feedback parameter, the processor and memory are configured to:
determine whether a physical uplink control channel (PUCCH) has been successfully decoded.

25. The apparatus of claim 18, wherein the contention window size corresponds to a transmission opportunity, and the contention window size is adjusted based at least in part on whether the transmission opportunity is self-scheduled or cross-carrier scheduled.

26. The apparatus of claim 18, wherein the processor and memory are configured to:
transmit the first transmission over one or more carriers.

27. The apparatus of claim 26, wherein the processor and memory are configured to:
transmit the first transmission over a plurality of carriers; and
determine a different contention window size for each of the plurality of carriers.

28. The apparatus of claim 26, wherein the processor and memory are configured to:
transmit the first transmission over a plurality of carriers;
receive a number of negative acknowledgements (NACKs) through hybrid automatic repeat request (HARQ) feedback for each of the plurality of carriers; and
adjust the contention window size for the second transmission for all of the plurality of carriers based at least in part on the number of NACKs for all of the plurality of carriers, wherein the contention window size is the same for all of the plurality of carriers.

29. The apparatus of claim 26, wherein the one or more carriers comprise a primary carrier and one or more secondary carriers, and the processor and memory are configured to:
start a backoff timer associated with the primary carrier, wherein the backoff timer applies to the one or more secondary carriers.

30. The apparatus of claim 18, wherein the processor and memory are configured to:
perform a clear channel assessment based at least in part on the contention window size.

31. The apparatus of claim 18, wherein the processor and memory are configured to:
transmit the second transmission on a carrier that is different from a carrier of the first transmission; and
refrain from resetting the contention window size.

32. The apparatus of claim 18, wherein the first transmission is sent to one or more UEs, and the processor and memory are configured to:
reset the contention window size.

33. The apparatus of claim 18, wherein the feedback parameter comprises an interference indication received in a PUCCH.

34. The apparatus of claim 18, wherein the contention widow size corresponds to a DL transmission opportunity following one or more DL transmission opportunities corresponding to the feedback parameter.

35. An apparatus for wireless communications comprising:
means for determining a feedback parameter associated with a first transmission;
means for determining a contention window adjustment value based at least in part on the feedback parameter, wherein determining the contention window adjustment value comprises weighting a non-reported acknowledgement as a reported negative acknowledgment (NACK); and
means for adjusting a contention window size for a second transmission based at least in part on the contention window adjustment value.

36. A non-transitory computer-readable medium storing computer-executable code for wireless communications, the code executable by a processor to:
determine a feedback parameter associated with a first transmission;
determine a contention window adjustment value based at least in part on the feedback parameter, wherein determining the contention window adjustment value comprises weighting a non-reported acknowledgement as a reported negative acknowledgment (NACK); and
adjust a contention window size for a second transmission based at least in part on the contention window adjustment value.

* * * * *